(12) United States Patent
Hattori et al.

(10) Patent No.: US 9,278,670 B2
(45) Date of Patent: Mar. 8, 2016

(54) ON-BOARD OPTICAL SENSOR COVER AND ON-BOARD OPTICAL SENSOR APPARATUS

(75) Inventors: Toshihiro Hattori, Okazaki (JP); Manabu Ono, Okazaki (JP)

(73) Assignee: DENSO CORPORATION, Kariya (JP)

(*) Notice: Subject to any disclaimer, the term of this patent is extended or adjusted under 35 U.S.C. 154(b) by 1303 days.

(21) Appl. No.: 12/923,482

(22) Filed: Sep. 23, 2010

(65) Prior Publication Data

US 2011/0073142 A1 Mar. 31, 2011

(30) Foreign Application Priority Data

Sep. 29, 2009 (JP) .................... 2009-224490
Apr. 20, 2010 (JP) .................... 2010-096894
Aug. 3, 2010 (JP) .................... 2010-174449

(51) Int. Cl.
- B08B 3/00 (2006.01)
- B08B 3/04 (2006.01)
- B60S 1/08 (2006.01)
- B60S 1/54 (2006.01)
- B60S 1/56 (2006.01)
- G03B 17/02 (2006.01)
- G03B 17/08 (2006.01)

(52) U.S. Cl.
CPC .......... B60S 1/0848 (2013.01); B60S 1/54 (2013.01); B60S 1/56 (2013.01); G03B 17/02 (2013.01); G03B 17/08 (2013.01)

(58) Field of Classification Search
CPC ........... B60S 1/0848; B60S 1/56; B60S 1/54; G03B 17/02; G03B 17/08
USPC ................ 134/56 R, 95.3, 104.2, 105, 198
See application file for complete search history.

(56) References Cited

U.S. PATENT DOCUMENTS

| | | | |
|---|---|---|---|
| 5,012,593 A | 5/1991 | Okada et al. | |
| 5,641,558 A | 6/1997 | Noda et al. | |
| 6,337,129 B1 | 1/2002 | Watanabe et al. | |
| 6,863,739 B2* | 3/2005 | Fratello et al. | 134/18 |
| 6,944,908 B2 | 9/2005 | Hoetzer et al. | |
| 7,532,233 B2 | 5/2009 | Chu | |
| 7,609,322 B2 | 10/2009 | Takada | |
| 2002/0005440 A1* | 1/2002 | Holt et al. | 239/284.2 |

(Continued)

FOREIGN PATENT DOCUMENTS

| | | |
|---|---|---|
| CN | 2784252 Y | 5/2006 |
| DE | 1 002 748 | 2/1957 |

(Continued)

OTHER PUBLICATIONS

Machine Translation of WO 0168425 to Hoetzer et al., Sep. 2001.*
Office action mailed Feb. 18, 2014 in the corresponding JP application No. 2011-048924 (and English translation).
Office Action mailed Jul. 17, 2012 in corresponding JP Application No. 2010-247005 (and English translation).

(Continued)

*Primary Examiner* — Michael Barr
*Assistant Examiner* — Benjamin L Osterhout
(74) *Attorney, Agent, or Firm* — Posz Law Group, PLC

(57) ABSTRACT

An on-board optical sensor apparatus includes an optical sensor, an optical sensor cover, and a controller. The optical sensor has a lens. The optical sensor cover includes a holder and a washer nozzle. The holder holds the optical sensor. The washer nozzle performs a washing operation to wash a lens surface of the lens of the optical sensor or a glass surface of a cover glass located facing the lens by spraying a washer fluid, supplied from a washer fluid tank, onto the lens surface or the glass surface. The controller controls the washing operation of the washer nozzle.

51 Claims, 33 Drawing Sheets

(56) References Cited

U.S. PATENT DOCUMENTS

| | | | |
|---|---|---|---|
| 2003/0090569 A1 | 5/2003 | Poechmueller | |
| 2003/0155001 A1 | 8/2003 | Hoetzer et al. | |
| 2005/0206511 A1 | 9/2005 | Heenan et al. | |
| 2006/0232670 A1 | 10/2006 | Chu | |
| 2007/0034235 A1* | 2/2007 | Weyandt et al. | 134/18 |
| 2007/0084484 A1 | 4/2007 | Porter et al. | |
| 2007/0132610 A1 | 6/2007 | Guernalec et al. | |
| 2007/0295374 A1* | 12/2007 | McCadden et al. | 134/180 |
| 2008/0060677 A1* | 3/2008 | Nakano | 134/6 |
| 2009/0211605 A1* | 8/2009 | Ahmad | 134/18 |
| 2009/0229630 A1 | 9/2009 | Porter et al. | |
| 2009/0250533 A1* | 10/2009 | Akiyama et al. | 239/284.1 |

FOREIGN PATENT DOCUMENTS

| | | |
|---|---|---|
| DE | 195 26 589 A1 | 1/1997 |
| DE | 10 2007 020 912 A1 | 11/2008 |
| EP | 0761500 | 3/1997 |
| EP | 1101534 | 5/2001 |
| FR | 2893891 | 6/2007 |
| JP | U-61-134469 | 8/1986 |
| JP | A-H03-85070 | 4/1991 |
| JP | U-4-043556 | 4/1992 |
| JP | U-5-016527 | 3/1993 |
| JP | U-H05-032191 | 4/1993 |
| JP | A-5-126530 | 5/1993 |
| JP | A-H06-258713 | 9/1994 |
| JP | A-H11-255018 | 9/1999 |
| JP | A-2000-004387 | 1/2000 |
| JP | A-2000-351356 | 12/2000 |
| JP | A-2001-171491 | 6/2001 |
| JP | A-2003-2115 | 1/2003 |
| JP | A-2003-267140 | 9/2003 |
| JP | 2004-182080 A | 7/2004 |
| JP | A-2004-182080 | 7/2004 |
| JP | A-2006-073013 | 3/2006 |
| JP | A-2007-053448 | 3/2007 |
| JP | A-2007-055562 | 3/2007 |
| JP | A-2008-165093 | 7/2008 |
| JP | A-2009-157194 | 7/2009 |
| JP | 2009-220719 A | 10/2009 |
| RU | 2018454 C1 | 8/1994 |
| WO | WO 0168425 A1 * | 9/2001 |
| WO | WO 2004/037622 A1 | 5/2004 |

OTHER PUBLICATIONS

Office Action mailed Jul. 17, 2012 in corresponding JP Application No. 2010-247006 (and English translation).

Office Action mailed Jul. 17, 2012 in corresponding JP Application No. 2010-247007 (and English translation).

Office Action mailed Jul. 17, 2012 in corresponding JP Application No. 2010-247008 (and English translation).

Office Action mailed Jul. 17, 2012 in corresponding JP Application No. 2010-247009 (and English translation).

Office Action mailed Aug. 31, 2012 issued in corresponding CN Application No. 201010502744.5 (and English translation).

Office Action mailed Oct. 25, 2011 from Russian Patent Office in corresponding Russian Patent application No. 2010139894 (and English translation).

Office Action mailed on Dec. 14, 2010 from Japan Patent Office in corresponding JP patent application No. 2010/247002 (English translation enclosed).

Office Action mailed May 22, 2012 from the Japan Patent Office in corresponding patent application No. 2010-247003 (English translation attached).

Office Action mailed May 26, 2011 in corresponding Swedish Patent application No. 1051002.2 (and English translation).

Office Action mailed Nov. 27, 2012 in corresponding JP Application No. 2010-247005, which is a divisional of JP Application No. 2010-174449 (and English translation).

Office Action mailed Sep. 6, 2013 in the corresponding on application No. 201010502744.5 (English translation).

Interrogation mailed May 21, 2013 in corresponding JP Application No. 2010-247005, which is a divisional of JP Application No. 2010-174449 (and English translation).

Office Action dated Mar. 29, 2013 issued in corresponding CN patent application No. 201010502744.5 (and English translation).

Office action dated Mar. 25, 2015 issued in corresponding CN patent application No. 201310366038.6 (and English translation).

Office action mailed Feb. 25, 2015 issued in corresponding CN patent application No. 201310366017.4 (and English translation).

Office Action mailed May 21, 2015 in co-pending related continuation-in-part U.S. Appl. No. 13/355,672.

Office Action dated Sep. 6, 2015 issued in corresponding CN patent application No. 201310366017.4 (and English translation).

* cited by examiner

FIG. 1A
FIG. 1B
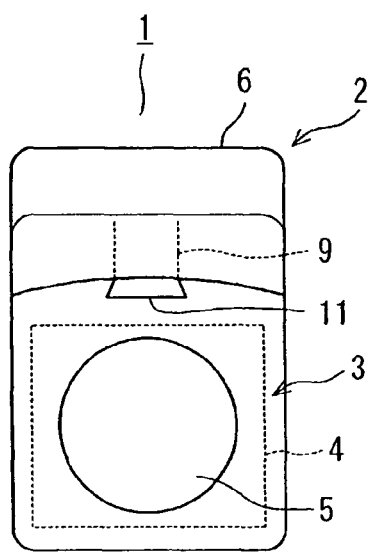
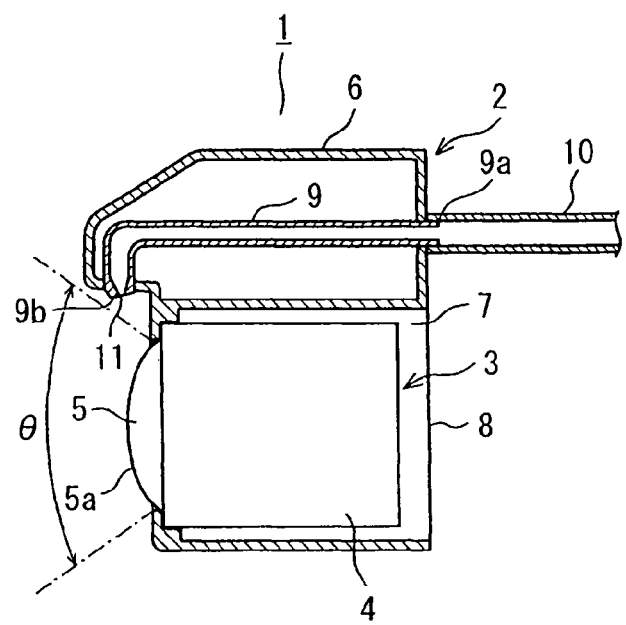

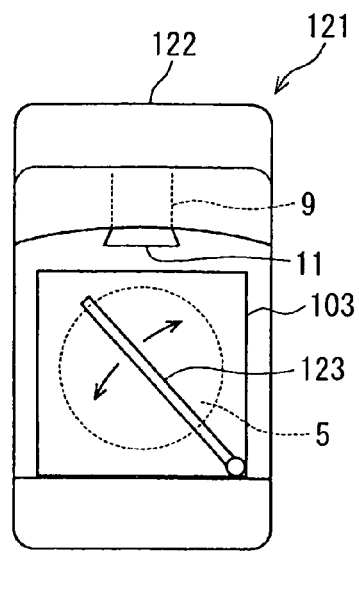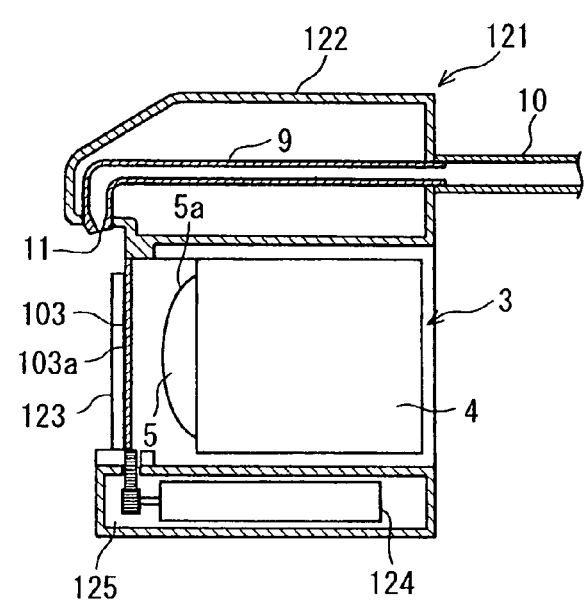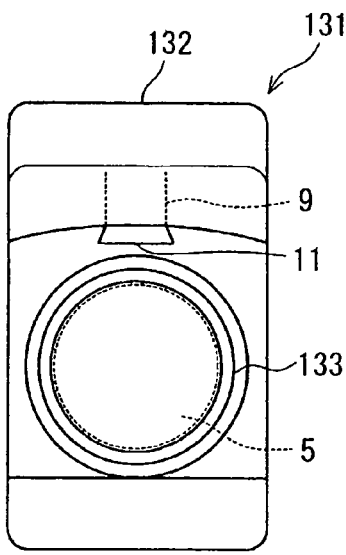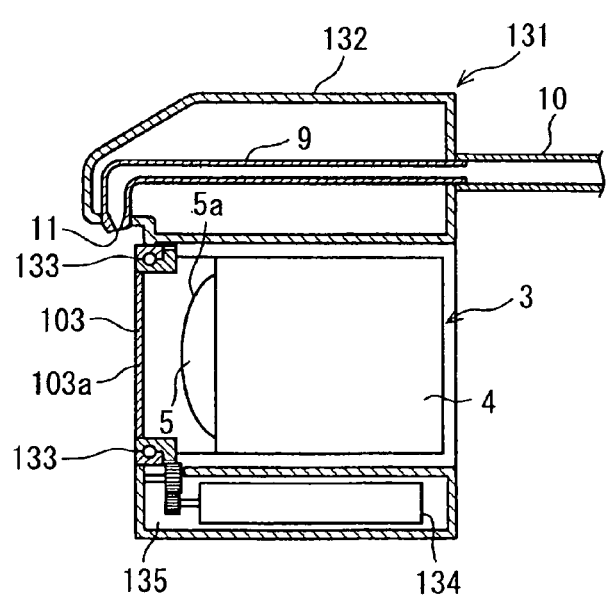

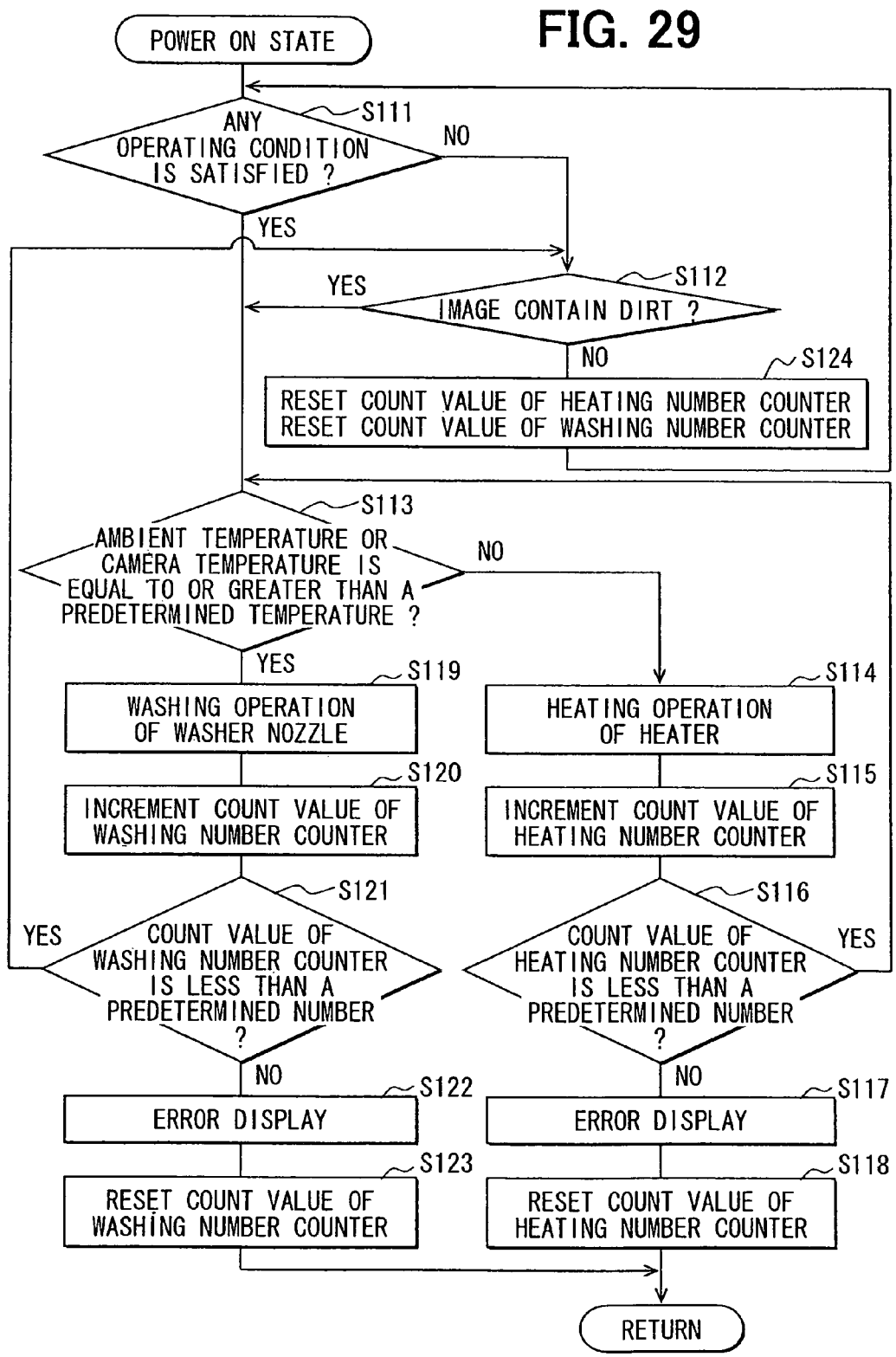

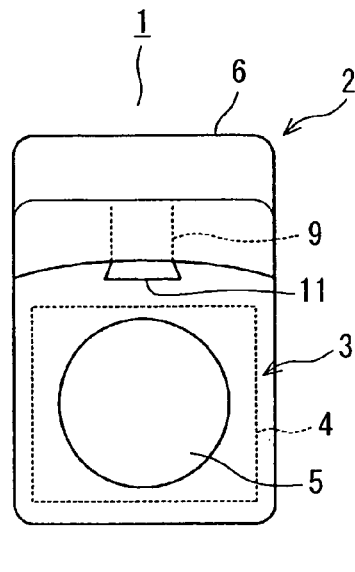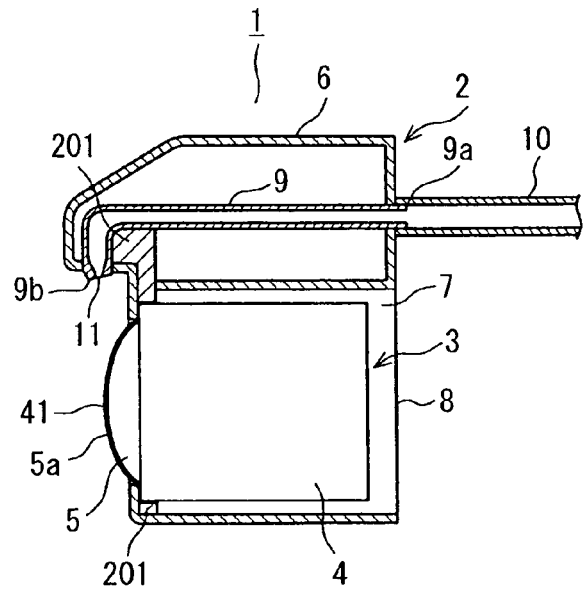
FIG. 30A FIG. 30B
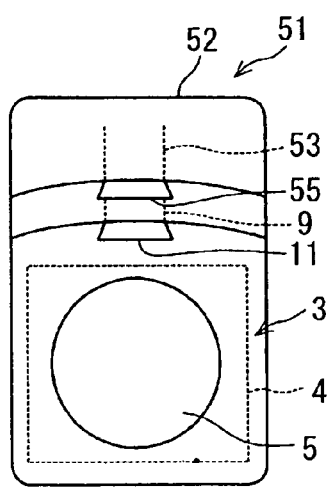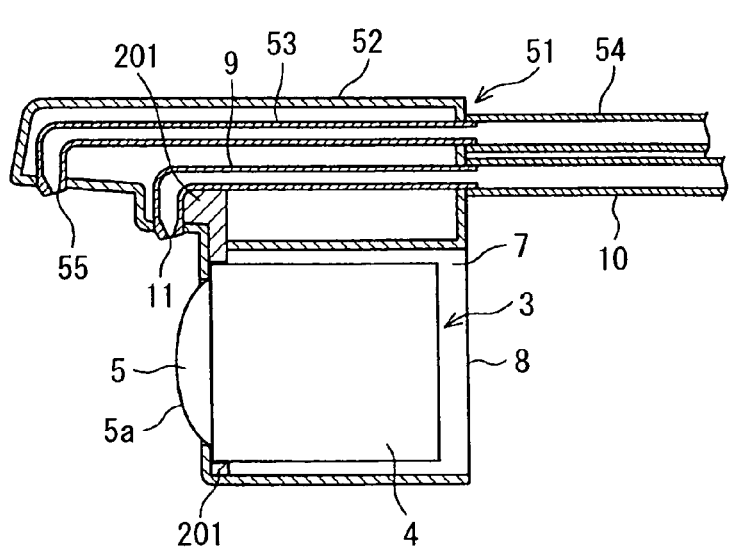
FIG. 31A FIG. 31B

FIG. 32A
FIG. 32B
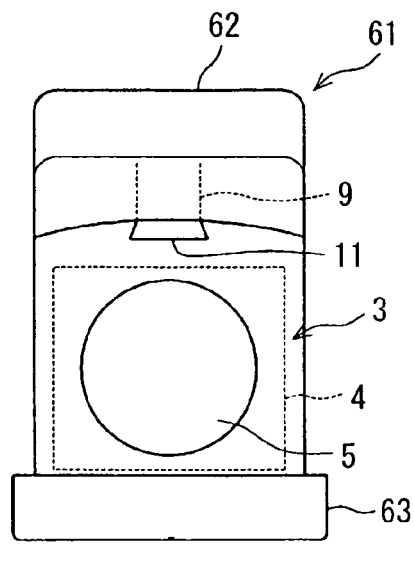
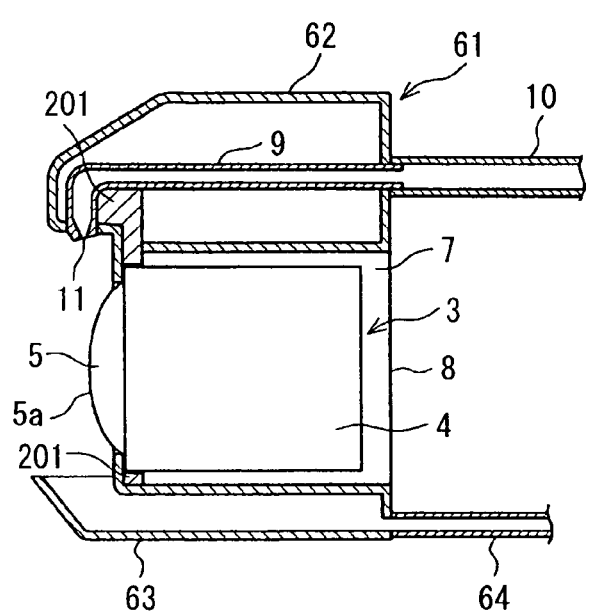
FIG. 33A
FIG. 33B
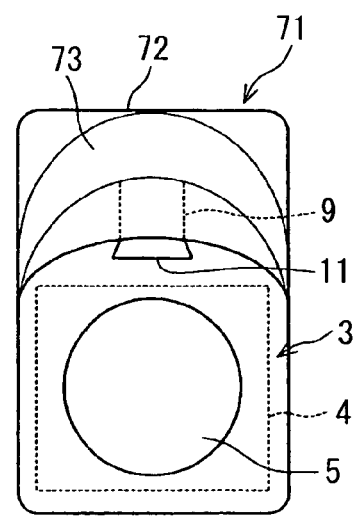
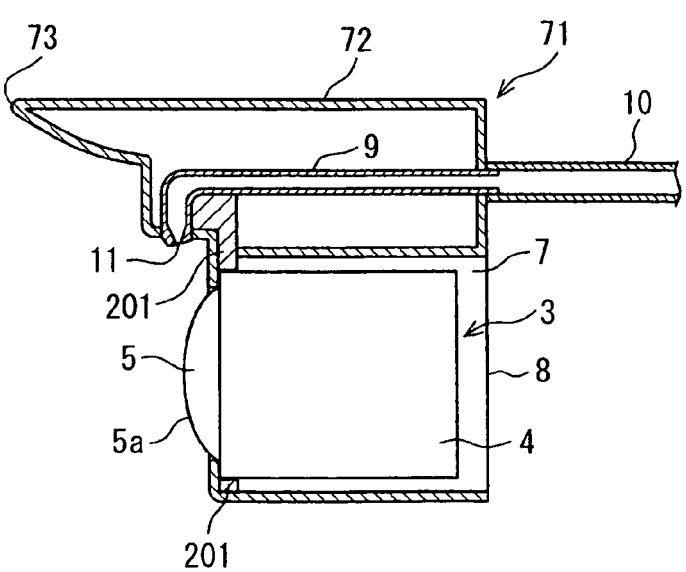

FIG. 34A
FIG. 34B
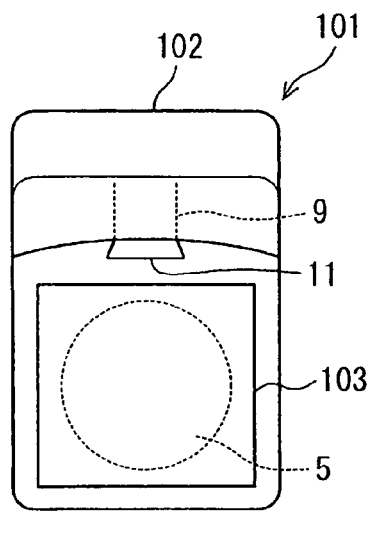
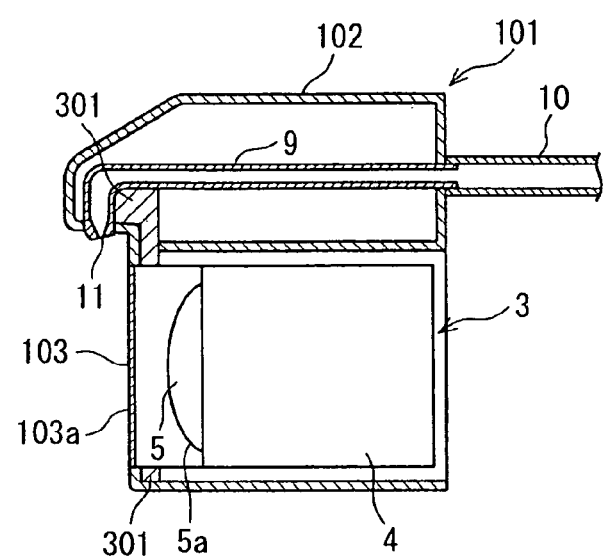
FIG. 35A
FIG. 35B
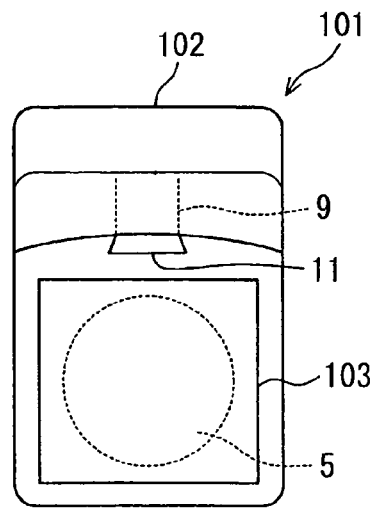
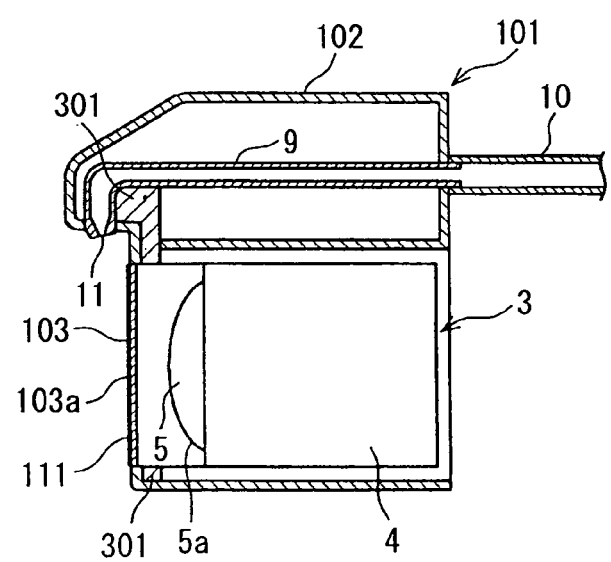

FIG. 40A
FIG. 40B
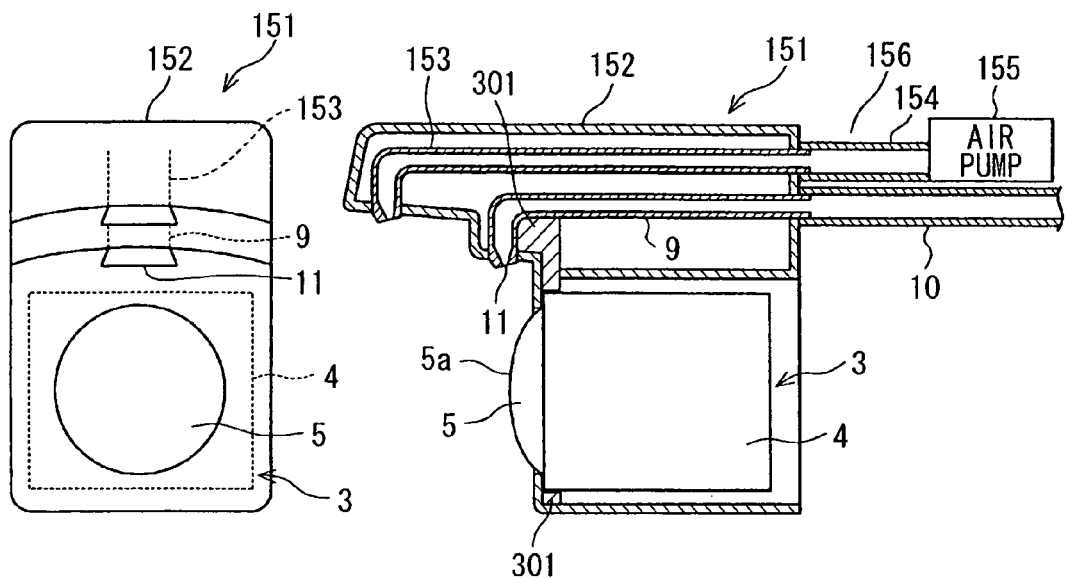
FIG. 41A
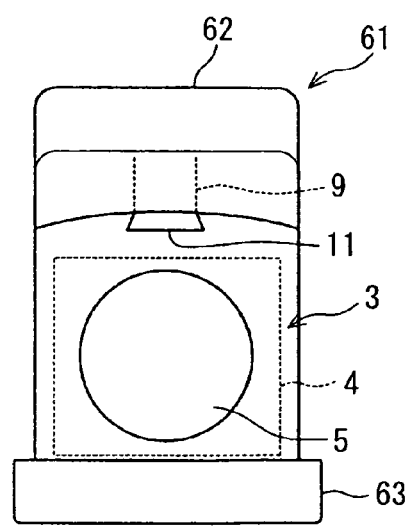
FIG. 41B
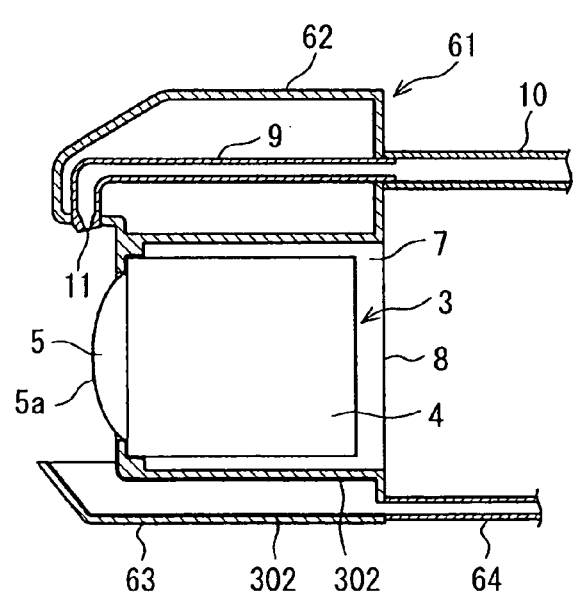

FIG. 44A
FIG. 44B
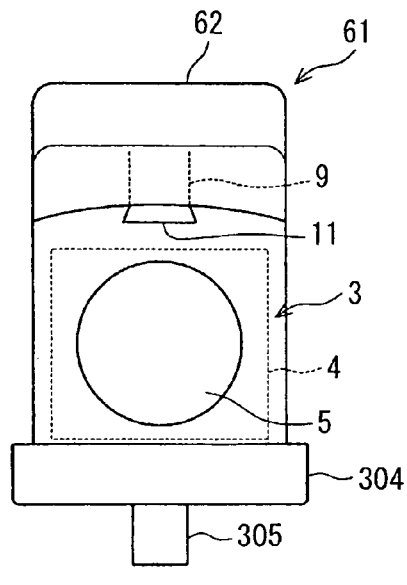
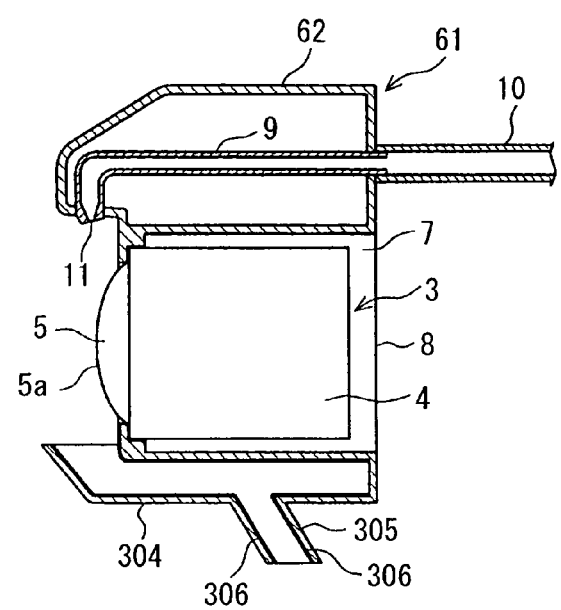
FIG. 45A
FIG. 45B
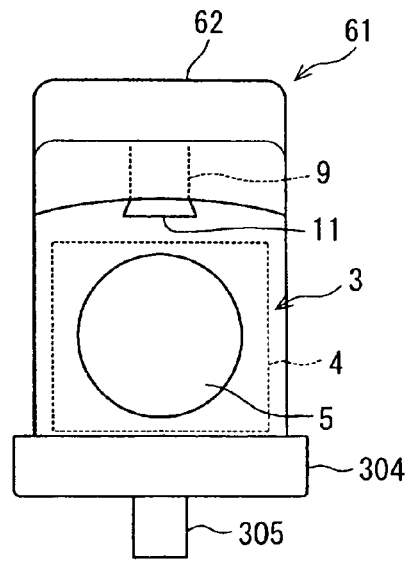
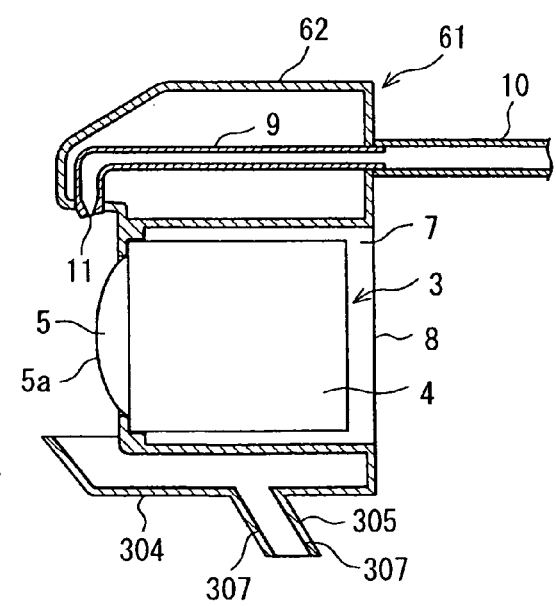

FIG. 48A
FIG. 48B
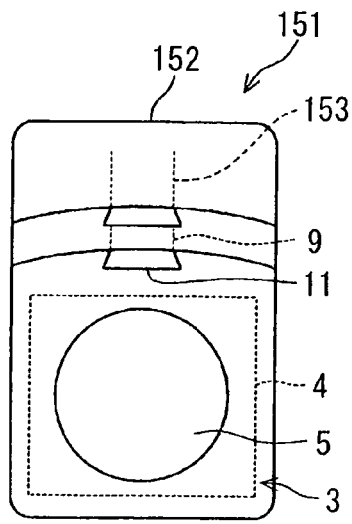
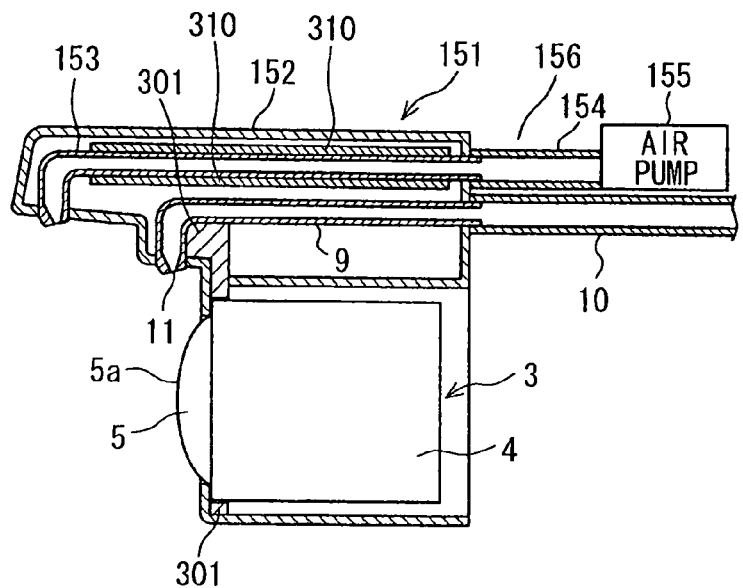
FIG. 49A
FIG. 49B
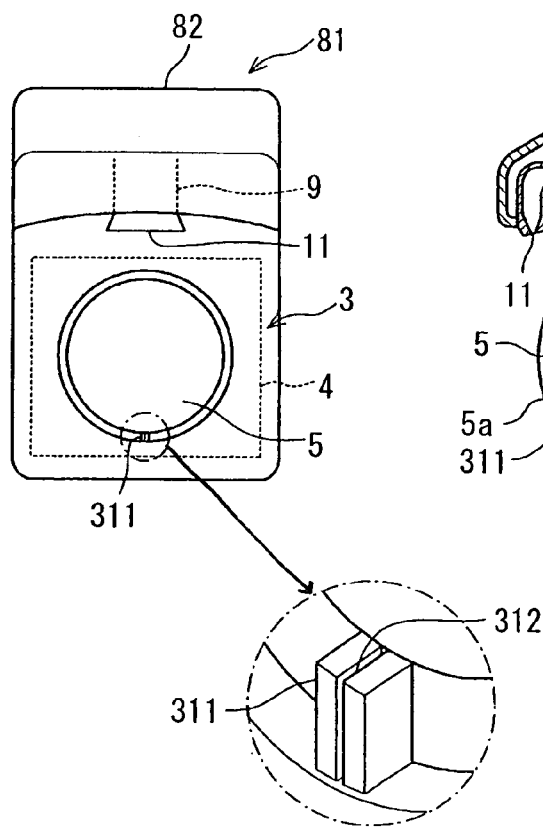
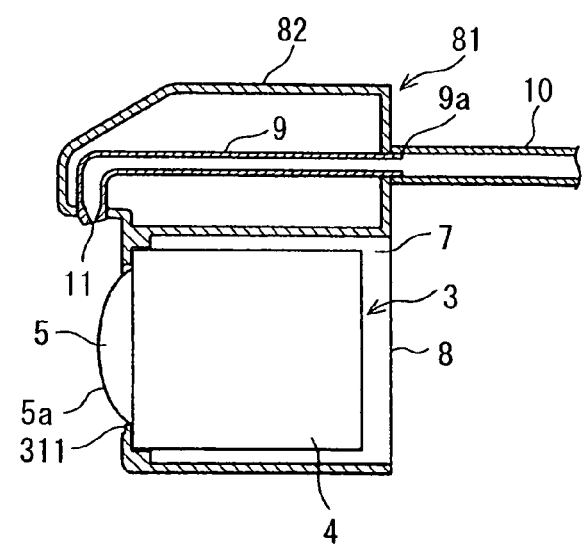

FIG. 51A
FIG. 51B
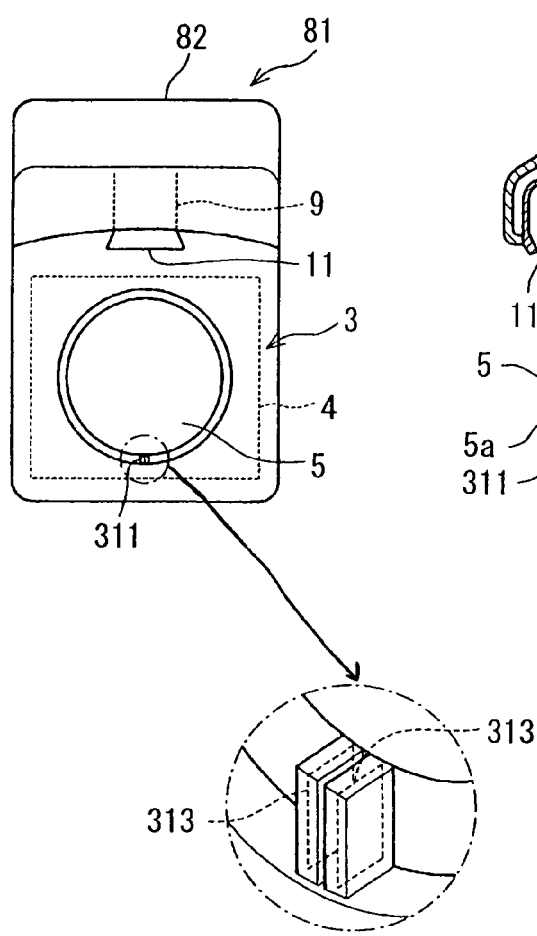
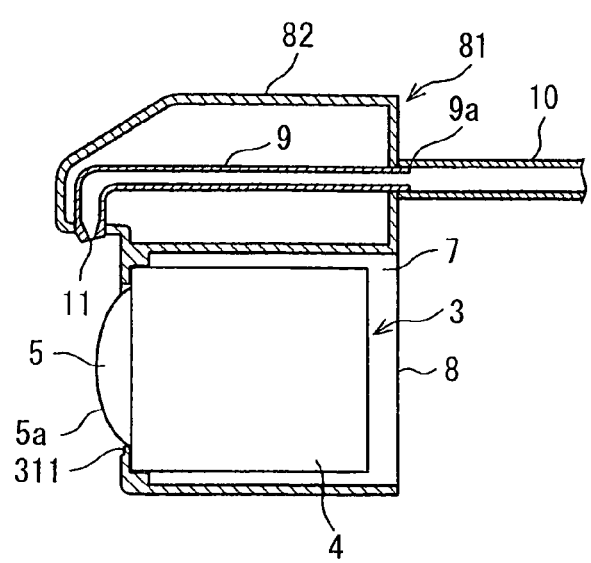

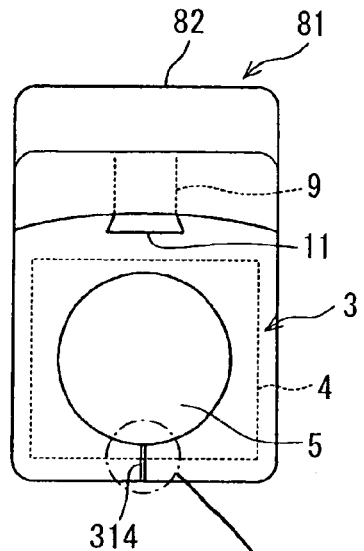
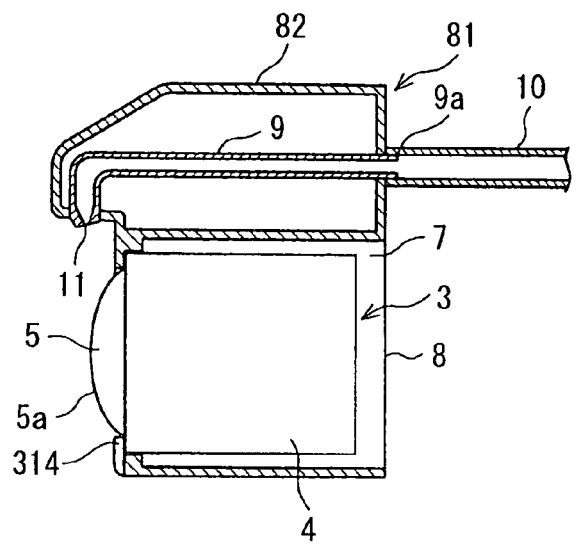
FIG. 52A  FIG. 52B
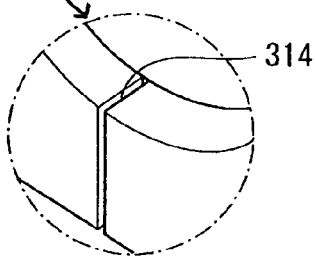
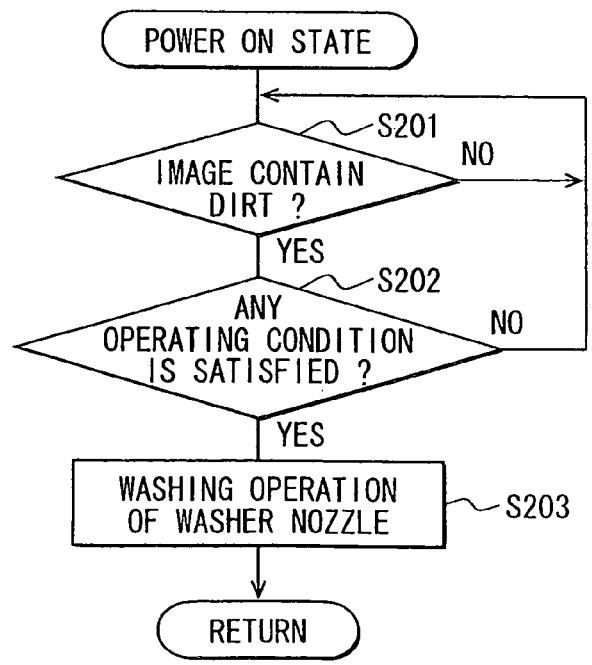
FIG. 53

ON-BOARD OPTICAL SENSOR COVER AND ON-BOARD OPTICAL SENSOR APPARATUS

CROSS REFERENCE TO RELATED APPLICATION

This application is based on and incorporates herein by reference Japanese Patent Application No. 2009-224490 filed on Sep. 29, 2009, No. 2010-96894 filed on Apr. 20, 2010, and No. 2010-174449 filed on Aug. 3, 2010.

FIELD OF THE INVENTION

The present invention relates to an on-board optical sensor cover used in combination with an optical sensor such as a camera or a laser mounted on a vehicle, and also relates to an on-board optical sensor apparatus including the on-board optical sensor cover and the optical sensor.

BACKGROUND OF THE INVENTION

In recent years, there has been a trend that a vehicle is equipped with an optical sensor such as a camera or a laser. It has been proposed that a compressed air generator for spraying compressed air is used to remove foreign matters such as water and dirt sticking to a lens surface of a lens of the optical sensor and that the foreign matters sticking to the lens surface is removed by spraying the compressed air from the compressed air generator onto the lens surface of the lens (refer to, for example, JP 2001-171491 A).

However, according to a technique disclosed in JP 2001-171491 A, the compressed air generator for spraying the compressed air is required. As a result, the cost and the size are increased.

SUMMARY OF THE INVENTION

In view of the above, it is an object of the present invention is to provide an on-board optical sensor cover and an on-board optical sensor apparatus for suitably removing a foreign matter sticking to a lens surface of a lens or a glass surface of a cover glass facing the lens while reducing the cost and the size by making a compressed air generator for spraying compressed air unnecessary.

According to an aspect of the present invention, an on-board optical sensor cover includes a holder for holding an optical sensor having a lens, and a washer nozzle for performing a washing operation to wash a lens surface of the lens of the optical sensor held in the holder or a glass surface of a cover glass located facing the lens if the cover glass exist by spraying a washer fluid, supplied from a washer fluid tank, onto the lens surface or the glass surface. Since the washer nozzle performs the washing operation, the washer fluid is suitably sprayed onto the lens surface or the glass surface so that a foreign matter sticking to the lens surface or the glass surface can be suitably removed. In this way, the foreign matter sticking to the lens surface the glass surface is suitably removed so that the optical sensor can work suitably, while reducing the cost and the size by making a compressed air generator for spraying compressed air unnecessary.

According to another aspect of the present invention, an on-board optical sensor apparatus includes the on-board optical sensor cover, a control device for controlling the washing operation of the washer nozzle, and the optical sensor having the lens. Therefore, the washer fluid is suitably sprayed onto the lens surface or glass surface so that the foreign matters sticking to the lens surface or glass surface can be suitably removed. In this way, the foreign matter sticking to the lens surface the glass surface is suitably removed so that the optical sensor can work suitably, while reducing the cost and the size by making a compressed air generator for spraying compressed air unnecessary.

BRIEF DESCRIPTION OF THE DRAWINGS

The above and other objectives, features and advantages of the present invention will become more apparent from the following detailed description made with check to the accompanying drawings. In the drawings:

FIG. 1A is a diagram illustrating a front view of an optical sensor unit according to a first embodiment of the present invention, and FIG. 1B is a diagram illustrating a cross-sectional side view of the optical sensor unit of FIG. 1A;

FIG. 16A is a diagram illustrating a front view of an optical sensor unit according to another modification, and FIG. 16B is a diagram illustrating a cross-sectional side view of the optical sensor unit of FIG. 16A;

FIG. 17A is a diagram illustrating a front view of an optical sensor unit according to another modification, and FIG. 17B is a diagram illustrating a cross-sectional side view of the optical sensor unit of FIG. 17A;

FIG. 29 is a flow chart of the optical sensor unit of the fourth embodiment;

FIG. 30A is a diagram illustrating a front view of an optical sensor unit according to a modification of the third and fourth embodiments, and FIG. 30B is a diagram illustrating a cross-sectional side view of the optical sensor unit of FIG. 30A;

FIG. 31A is a diagram illustrating a front view of an optical sensor unit according to another modification, and FIG. 31B is a diagram illustrating a cross-sectional side view of the optical sensor unit of FIG. 31A;

FIG. 32A is a diagram illustrating a front view of an optical sensor unit according to another modification, and FIG. 32B is a diagram illustrating a cross-sectional side view of the optical sensor unit of FIG. 32A;

FIG. 33A is a diagram illustrating a front view of an optical sensor unit according to another modification, and FIG. 33B is a diagram illustrating a cross-sectional side view of the optical sensor unit of FIG. 33A;

FIG. 34A is a diagram illustrating a front view of an optical sensor unit according to another modification, and FIG. 34B is a diagram illustrating a cross-sectional side view of the optical sensor unit of FIG. 34A;

FIG. 35A is a diagram illustrating a front view of an optical sensor unit according to another modification, and FIG. 35B is a diagram illustrating a cross-sectional side view of the optical sensor unit of FIG. 35A;

FIG. 40A is a diagram illustrating a front view of an optical sensor unit according to another modification, and FIG. 40B is a diagram illustrating a cross-sectional side view of the optical sensor unit of FIG. 40A;

FIG. 41A is a diagram illustrating a front view of an optical sensor unit according to another modification, and FIG. 41B is a diagram illustrating a cross-sectional side view of the optical sensor unit of FIG. 41A;

FIG. 44A is a diagram illustrating a front view of an optical sensor unit according to another modification, and FIG. 44B is a diagram illustrating a cross-sectional side view of the optical sensor unit of FIG. 44A;

FIG. 45A is a diagram illustrating a front view of an optical sensor unit according to another modification, and FIG. 45B, is a diagram illustrating a cross-sectional side view of the optical sensor unit of FIG. 45A;

FIG. 48A is a diagram illustrating a front view of an optical sensor unit according to another modification, and FIG. 48B is a diagram illustrating a cross-sectional side view of the optical sensor unit of FIG. 48A;

FIG. 49A is a diagram illustrating a front view of an optical sensor unit according to another modification, and FIG. 49B is a diagram illustrating a cross-sectional side view of the optical sensor unit of FIG. 49A;

FIG. 51A is a diagram illustrating a front view of an optical sensor unit according to another modification, and FIG. 51B is a diagram illustrating a cross-sectional side view of the optical sensor unit of FIG. 51A;

FIG. 52A is a diagram illustrating a front view of an optical sensor unit according to another modification, and FIG. 52B is a diagram illustrating a cross-sectional side view of the optical sensor unit of FIG. 52A;

FIG. 53 is a flow chart of an optical sensor unit according to another modification of the fourth embodiment.

DETAILED DESCRIPTION OF THE PREFERRED EMBODIMENTS

First Embodiment

Figure 2:
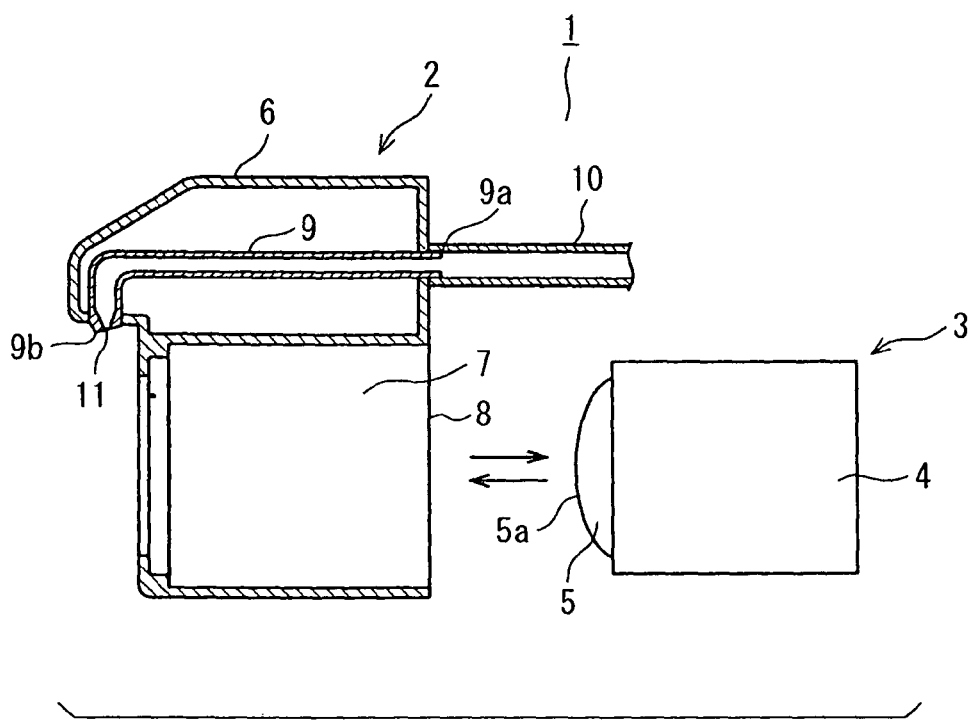
FIG. 2 is a diagram illustrating a manner in which a camera cover and a camera of the optical sensor unit according to the first embodiment are separated from each other.

A first embodiment related to a camera embodying an optical sensor of the present invention is described below with reference to FIGS. 1A-5.

As shown in FIGS. 1A and 1B, an optical sensor unit 1 (an on-board optical sensor apparatus of the present invention) includes a camera cover 2 (an on-board optical sensor cover of the present invention) and a camera 3. The camera 3 is attached to the camera cover 2 in a detachable manner. In the camera 3, a lens 5 is located on a front side (a left side in FIG. 1B) of a casing 4, and a power supply line (not shown) and an image signal output line (not shown) are drawn from a rear side (a right side in FIG. 1B) of the casing 4. The power supply line is used to supply power to the camera 3. The image signal output line is used to output an image signal. The lens 5 is a fisheye lens and has a curved lens surface 5a that can take a wide-angle image.

Figure 4:
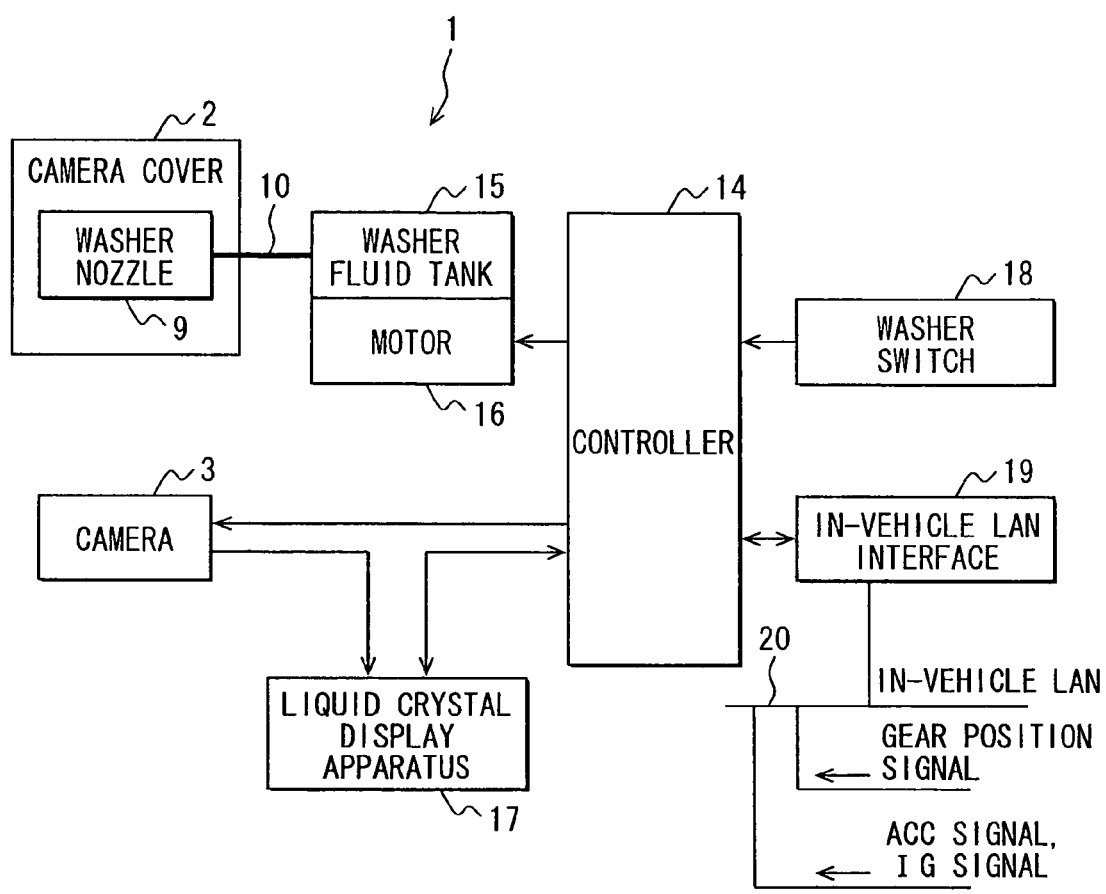
FIG. 4 is a functional diagram of the optical sensor unit according to the first embodiment.

In the camera cover 2, a holder 7 for holding the camera 3 is located in a casing 6, and an opening 8 is located on a rear side of the casing 6. As shown in FIG. 2, the camera 3 is attached to the camera cover 2 through the opening 8 and detached from the camera cover 2 through the opening 8. In the camera cover 2, a washer nozzle. 9 is located above the holder 7. The washer nozzle 9 has a "L" shape. A base end 9a of the washer nozzle 9 is connected to a tube 10 on the rear side of the casing 6. A tip end 9b of the washer nozzle 9 has an opening directed downward and serves as a spray opening 11. In a condition where the camera 3 is normally held in the holder 7 (in a normal use condition shown in FIGS. 1A and 1B), the lens surface 5a of the lens 5 of the camera 3 is located directly below the tip end 9b of the washer nozzle 9. It is noted that the spray opening 11 of the washer nozzle 9 is located in an area outside an angle of view (indicated by FIG. 4 is a functional block diagram illustrating an electrical configuration of peripheral circuitry including the optical sensor unit 1. The on-board optical sensor apparatus of the present invention includes the optical sensor unit 1 and a controller 14. The controller 14 (a control device, a gear position detection device, a vehicle activation start detection device, a vehicle activation end detection device, an image dirt detection device, or an image fog detection device of the present invention) mainly includes a microcomputer. The controller 14 executes a prestored control program, thereby controlling a capture operation of the camera 3 and controlling an operation of a motor 16 installed in a washer fluid tank 15 so as to control a washing operation of the washer nozzle 9.

In this case, when the motor 16 is driven, a washer fluid stored in the washer fluid tank 15 is supplied to the washer nozzle 9 through the tube 10. The washer fluid supplied to the washer nozzle 9 is hydraulically splayed from the spray opening 11 onto the lens surface 5a of the lens 5 of the camera 3. The washer fluid can be sprayed in various manners. For example, the washer fluid can be sprayed onto the lens surface 5a in the form of a mist. For another example, a moderate amount of the washer fluid can be supplied to the lens surface 5a in the form of a grail) that is not finer than the mist. For further another example, a predetermined amount of the washer fluid can be supplied to the lens surface 5a in the form of a block at a time. It is noted that the washer fluid tank 15 is installed in a typical engine room of the vehicle body 12.

A liquid crystal display apparatus 17 (a reporting device of the present invention) is located in a vehicle compartment. When receiving the image signal outputted from the camera 3, the liquid crystal display apparatus 17 displays an image corresponding to the image signal by decoding the image signal. The controller 14 detects whether the image contains dirt or fog by analyzing the image displayed on the liquid crystal display apparatus 17 (for example, by determining whether pixel brightness is large or small).

A washer switch 18 is operable by a user. When a user operates the washer switch 18, the washer switch 18 outputs an operation detection signal to the controller 14. When receiving the operation detection signal outputted from the washer switch 18, the controller 14 outputs a drive command signal to the motor 16, thereby driving the motor 16. For example, the drive command signal outputted from the controller 14 to the motor 16 is a level signal, and the washing operation of the washer nozzle 9 is performed only during a period of time where the level signal is ON (high level). The washer switch 18 can be a mechanical switch or a touch switch displaced on the liquid crystal display apparatus 17.

An in-vehicle LAN interface 19 receives a gear position signal indicative of a position of a gear of the vehicle, an ACC signal indicative of an ON/OFF state of an ACC (accessory) switch, and an IG signal indicative of an ON/OFF state of an IG (ignition) switch from various types of ECUs through an in-vehicle LAN 22. Then, the in-vehicle LAN interface 19 outputs the received various types of signals to the controller 14. When receiving the various types of signals outputted from the in-vehicle LAN interface 19, the controller 14 analyzes the received various types of signals, thereby detecting the position of the gear, the ON/OFF state of the ACC switch, and the ON/OFF state of the IG switch.

Next, an action of the above configuration is described below with reference to FIG. 5.

In a power-ON state (in a driven state of the optical sensor unit 1), the controller 14 determines whether the washer switch 18 is operated (step S1). When the controller 14 receives the operation detection signal outputted from the washer switch 18 and determines that the washer switch 18 is operated ("YES" at step S1), the controller 14 outputs the drive commend signal to the motor 16 to drive the motor 16, thereby performing the washing operation of the washer nozzle 9 (step S2). That is, the washer fluid stored in the washer fluid tank 15 is supplied to the washer nozzle 9 and splayed from the spray opening 11 onto the lens surface 5a of the lens 5 of the camera 3. In this case, the controller 14 can continue the washing operation of the washer nozzle 9 only for a predetermined period of time (for example, a few seconds). Alternatively, the controller 14 can continue the washing operation of the washer nozzle 9 only while a user is operating (for example, pressing) the washer switch 18. Further, if a function of measuring the amount of the washer fluid is included, the washing operation of the washer nozzle 9 can be continued only until the amount of the splayed washer fluid reaches a predetermined amount. It is noted that the controller 14 repeats the above steps S1, S2.

As described above, according to the first embodiment, the camera cover 2 attachable to and detachable from the camera 3 is provide with the washer nozzle 9 for spraying the washer fluid supplied from the washer fluid tank 15 onto the lens surface 5a of the lens 5 of the camera 3 so as to wash the lens surface 5a. In such an approach, a conventional compressed air generating unit for spraying compressed air is made unnecessary so that cost and size can be reduced. A foreign matter sticking to the lens surface 5a is suitably removed so that the camera 3 can suitably work. Further, since the camera cover 2 is attachable to and detachable from the camera 3 can be independently replaced easily.

Second Embodiment

Figure 6:
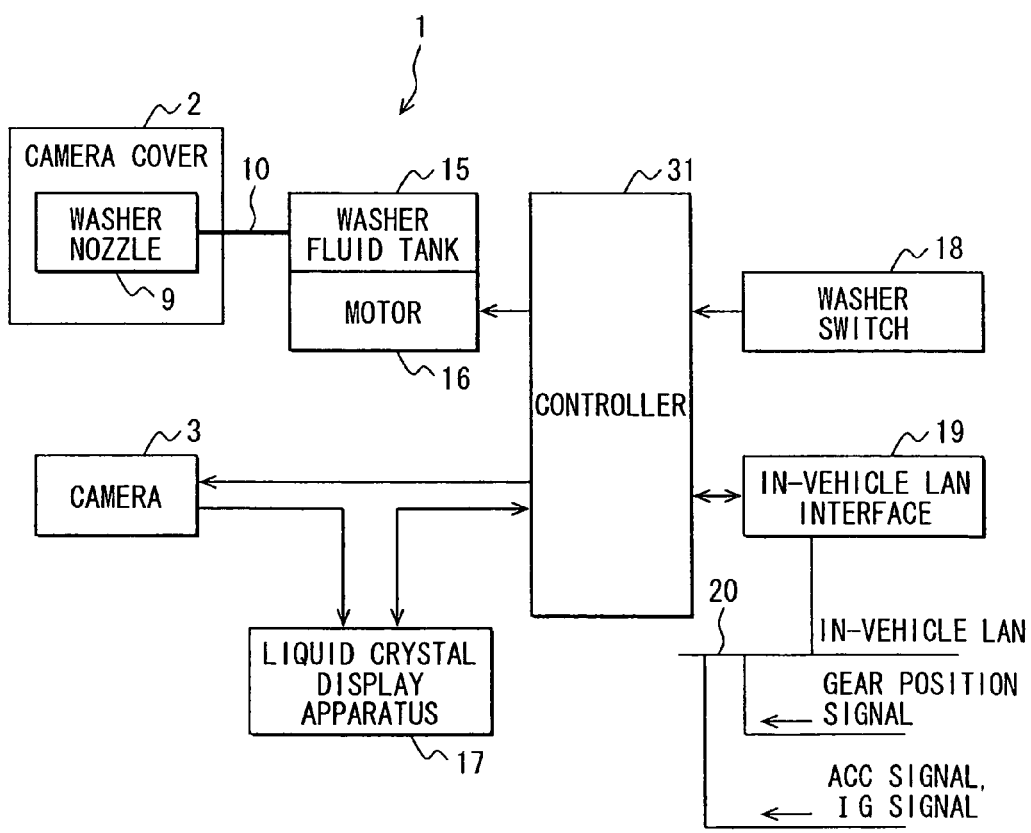
FIG. 6 is a functional diagram of an optical sensor unit according to a second embodiment of the present invention.

A second embodiment of the present invention is described below with reference to FIGS. 6 and 7. The second embodiment differs from the first embodiment in the following points. In the first embodiment, the washing operation of the washer nozzle 9 is triggered when the washer switch 18 is operated by a user. That is, the washing operation of the washer nozzle 9 is manually performed. In the second embodiment, operating conditions include detection of the fact that the gear is shifted into a reverse position (detection of the fact that a gear of a vehicle is in a predetermined position in the present invention), detection of the fact that the IG switch is switched from an OFF state to an ON state (detection of the fact that activation of a vehicle is started in the present invention), and detection of the fact that the IG switch is switched from the ON state to the OFF state (detection of the fact that activation of a vehicle is ended in the present invention). The washing operation of the washer nozzle 9 is triggered when any of the operating conditions is satisfied or when the image contains dirt. That is, the washing operation of the washer nozzle 9 is automatically performed. A controller 31 according to the second embodiment has a counting function.

Figure 7:
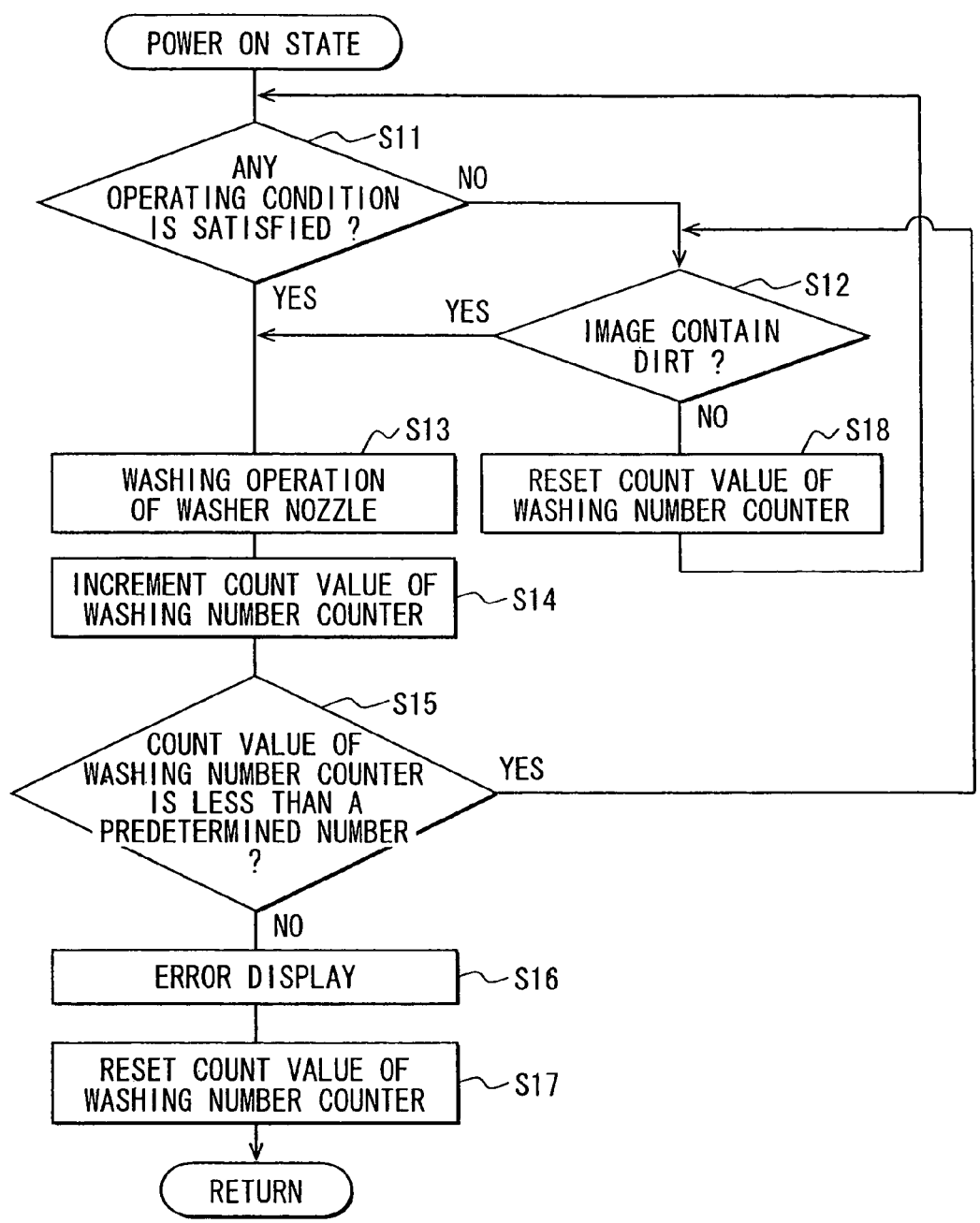
FIG. 7 is a flow chart of the optical sensor unit according to the second embodiment.

In FIG. 7, in the power-ON state (in the driven state of the optical sensor unit 1), the controller 31 determines whether any of the operating conditions is satisfied (step S11) and determines whether the image contains dirt (step S12). Then, if the controller 31 determines that any of the operating conditions is satisfied, i.e., determines that the gear is shifted into the reverse position, the IG switch is switched from the OFF state to the ON state, or the IG switch is switched from the ON state to the OFF state ("YES" at step S11), or if the controller 31 determines that the image contains dirt ("YES" at step S12), the controller 31 drives the motor 16, thereby performing the washing operation of the washer nozzle 9 for a predetermined period of time (step S13).

Then, the controller 31 increments (addition of "1") a washing number counter (step S14) and determines whether a value of the incremented washing number counter is less than a predetermined number (step S15). If the controller 31 determines that the value of the incremented washing number counter is less than the predetermined number ("YES" at step S15), the controller 31 returns to step S12 and repeats the steps subsequent to step S12. In contrast, if the controller 31 determines that the value of the incremented washing number counter is equal to or greater than the predetermined number ("NO" at step S15), the controller 31 causes the liquid crystal display apparatus 17 to display an error display indicating that the washing operation of the washer nozzle 9 was performed the predetermined number of times (step S16). Then, the controller 31 resets the value of the washing number counter (step S17) and finishes the series of procedures.

If the controller 31 determines that the image contains no dirt (dirt is removed as a result of the washing operation of the washer nozzle 9) ("NO" at step S12), the controller 31 resets the value of the washing number counter (step S18), then returns to step S11, and repeats the steps subsequent to step S11.

As described above, according to the second embodiment, the lens surface 5a of the lens 5 of the camera 3 can be automatically washed whenever it is detected that the gear of the vehicle is shifted into the reverse position, the IG switch is switched from the OFF state to the ON state, the IG switch is switched from the ON state to the OFF state, or the image contains dirt. Further, the error display is displayed when the washing number counter becomes equal to or greater than the predetermined number. Alternatively, if a function of measuring the washing time is included, the error display can be displayed when the washing time reaches a predetermined time.

The embodiments described above can be modified or extended as follows.

The optical sensor is not limited to the camera 3 and can be a sensor, such as a laser, that has a lens and optically measures a physical quantity.

In the embodiments, in the case where the value of the washing number counter becomes equal to or greater than the predetermined number, the error display is displayed on the liquid crystal display apparatus 17. Alternatively, in such a case, an error surround can be outputted from a speaker, or vibration or static electricity can be generated from a seat or a handle by a static electricity generator or a vibration generator mounted to the seat or the handle. Alternatively, these can be used in combination with each other. That is, reporting can be performed through any of the sense of sight, the sense of hearing, and the sense of touch.

Figure 5:
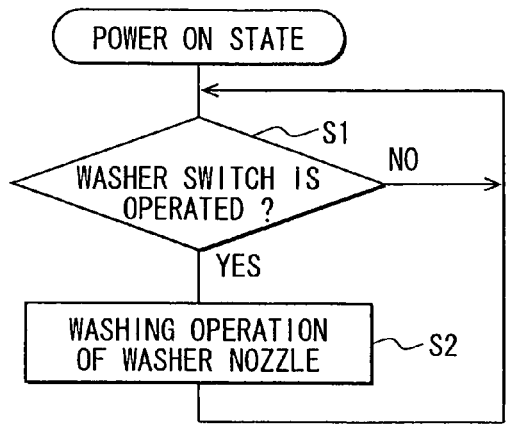
FIG. 5 is a flow chart of the optical sensor unit according to the first embodiment.

The configuration, shown in FIG. 5, in which the washing operation of the washer nozzle 9 is manually performed, can be used in combination with the configuration, shown in FIG. 7, in which the washing operation of the washer nozzle 9 is automatically performed.

Figure 8A:
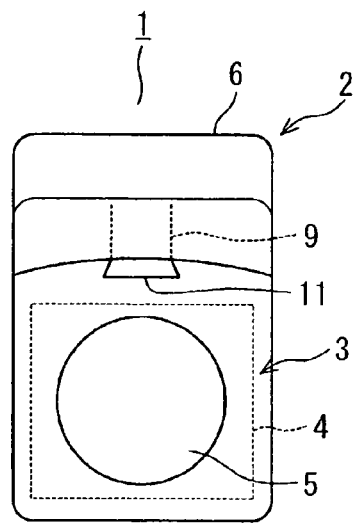
FIG. 8A is a diagram illustrating a front view of an optical sensor unit according to a modification of the first and second embodiments.
Figure 8B:
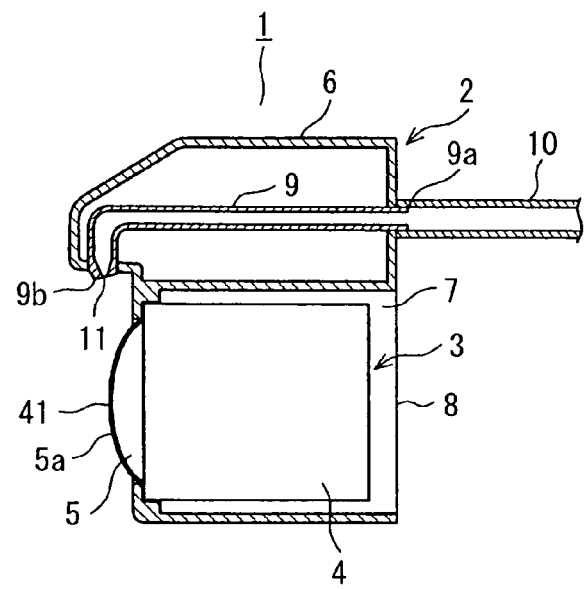
FIG. 8B is a diagram illustrating a cross-sectional side view of the optical sensor unit of FIG. 8A.

As shown in FIGS. 8A and 8B, a water-repellent treatment can be applied to the lens surface 5a of the lens 5 of the camera 3 so that the lens surface 5a can be coated with a water-repellent layer 41. Alternatively, a hydrophilic treatment, a photocatalytic treatment, or an antifouling treatment can be applied to the lens surface 5a so that the lens surface 5a can be coated with a hydrophilic layer, a photocatalytic layer, or an antifouling layer. In such an approach, it is possible to prevent foreign matters such as water and dirt from sticking to the lens surface 5a. Further, even if foreign matters such as water and dirt stick to the lens surface 5a, the washing operation of the washer nozzle 9 is performed so that the lens surface 5a can be suitably washed.

Figure 9A:
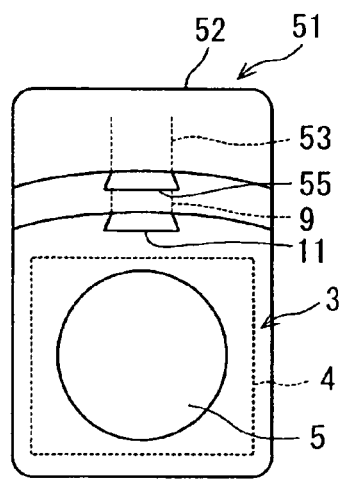
FIG. 9A is a diagram illustrating a front view of an optical sensor unit according to another modification.
Figure 9B:
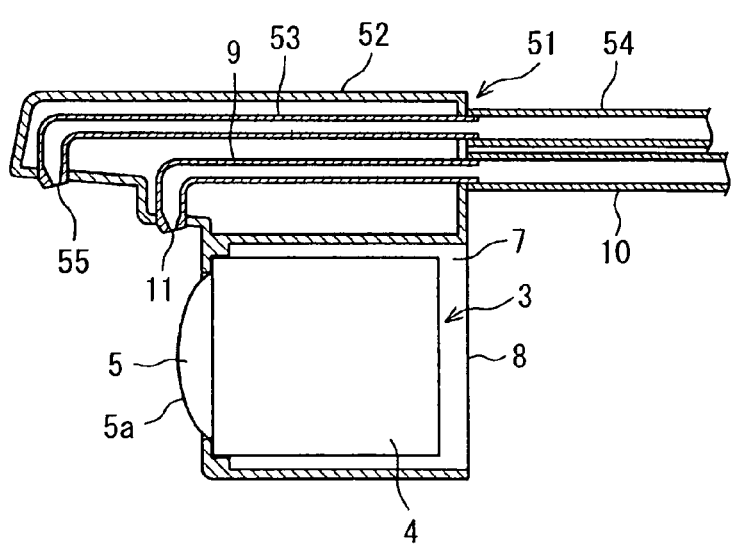
FIG. 9B is a diagram illustrating a cross-sectional side view of the optical sensor unit of FIG. 9A.

As shown in FIGS. 9A and 9B, a casing 52 of a camera cover 51 can be provided with a window washer nozzle 53 that is arranged parallel to the washer nozzle 9. The washer fluid stored in the washer fluid tank 15 can be supplied to the window washer nozzle 53 through a tube 54, and the washer fluid supplied to the window washer nozzle 53 can be splayed from a spray opening 55 onto a window. In such an approach, not only the lens surface 5a of the lens 5 of the camera 3 but also the window can be washed so that multiple functions can be achieved. Alternatively, a washer fluid tank for storing the washer fluid supplied to the window washer nozzle 53 can be provided separately from the washer fluid tank 15 for storing the washer fluid supplied to the washer nozzle 9. Alternatively, a spay direction of the spray opening 11 of the washer nozzle 9 can be variable so as to selectively perform an operation for spraying the washer fluid onto the lens surface 5a of the lens 5 of the camera 3 and an operation for spaying the washer fluid onto the window.

Figure 10A:
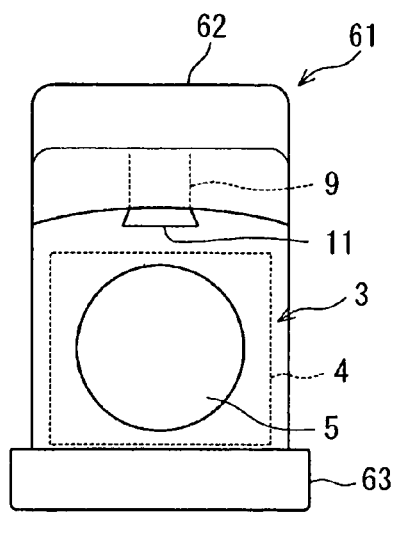
FIG. 10A is a diagram illustrating a front view of an optical sensor unit according to another modification.
Figure 10B:
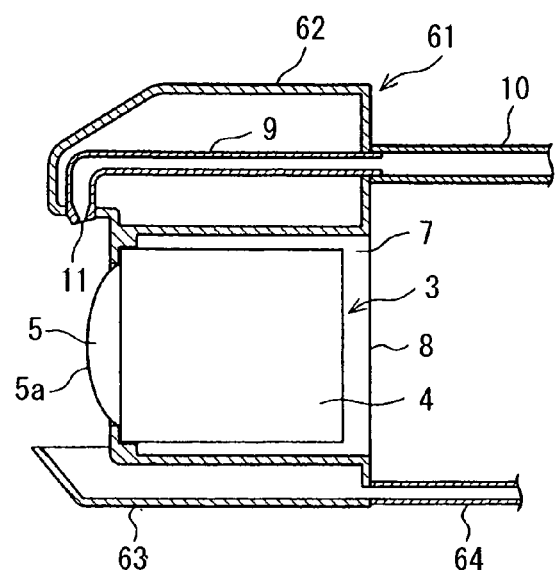
FIG. 10B is a diagram illustrating a cross-sectional side view of the optical sensor unit of FIG. 10A.

As shown in FIGS. 10A and 10B, a casing 62 of a camera cover 61 can be provided a pan 63 and a tube 64. When the washer fluid is sprayed from the splay opening 11 of the washer nozzle 9 onto the lens surface 5a of the lens 5 of the camera 3, the pan 63 can catch the washer fluid dripping from the lens surface 5a, and the washer fluid caught by the pan 63 can be drained through the tube 64. In such an approach, it is possible to prevent the window from becoming soiled by the washer fluid dripping from the lens surface 5a. Alternatively, the pan can have a hole, and the washer fluid dripping from the lens surface 5a can be supplied to the window through the hole so that the window can be washed.

Figure 11A:
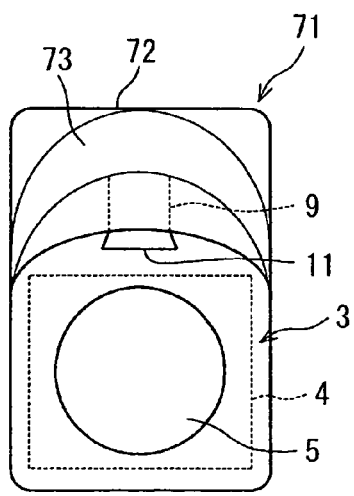
FIG. 11A is a diagram illustrating a front view of an optical sensor unit according to another modification.
Figure 11B:
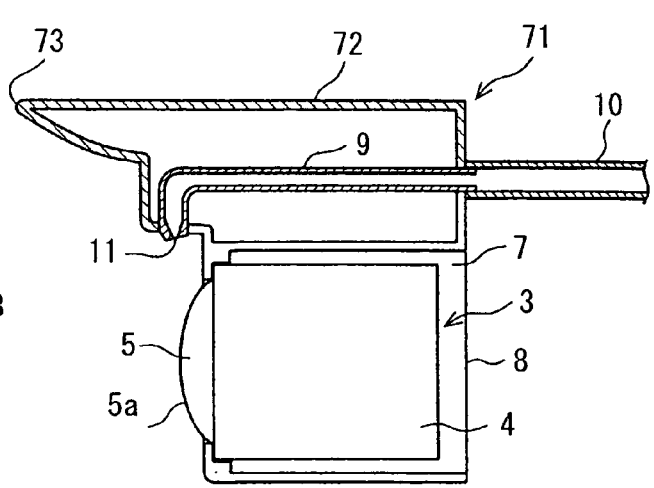
FIG. 11B is a diagram illustrating a cross-sectional side view of the optical sensor unit of FIG. 11A.

As shown in FIGS. 11A and 11B, a casing 72 of a camera cover 71 can be provided with a canopy 73. The canopy 73 has a projection for covering the lens surface 5a from above. In such an approach, it is possible to prevent foreign matters such as water and dirt (in particular, raindrop) coming from above from sticking to the lens surface 5a.

Figure 12A:
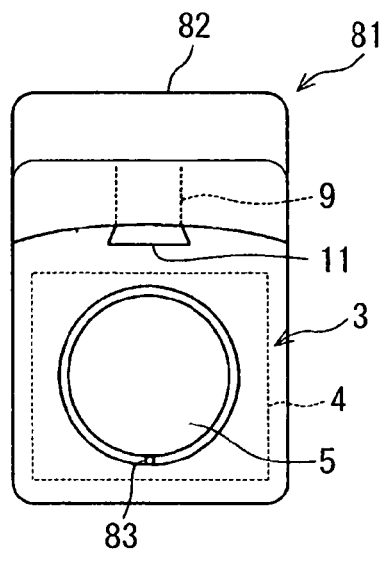
FIG. 12A is a diagram illustrating a front view of an optical sensor unit according to another modification.
Figure 12B:
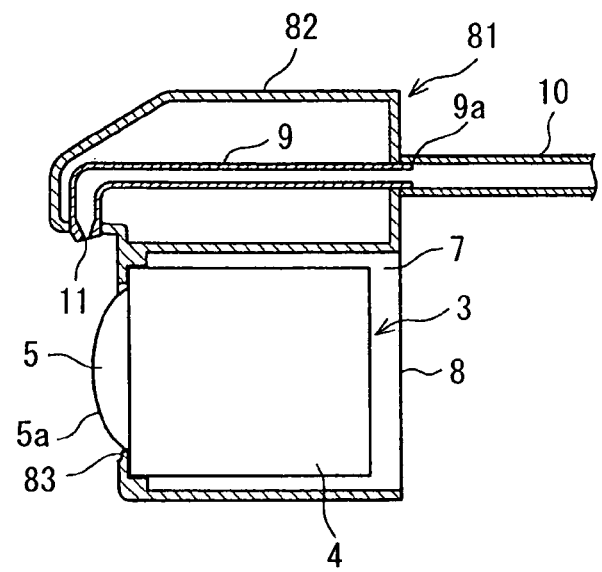
FIG. 12B is a diagram illustrating a cross-sectional side view of the optical sensor unit of FIG. 12A.

As shown in FIGS. 12A and 12B, a casing 82 of a camera cover 81 can be provided with a projection 83 that is located at a position (directly below the lens 5) near a bottom edge of the lens surface 5a of the lens 5 of the camera 3. In such an approach, even if water accumulates in the bottom edge of the lens surface 5a, the water accumulating in the bottom edge of the lens surface 5a comes in contact with the projection 83, is guided below the lens surface 5a, and thus removed.

Figure 13A:
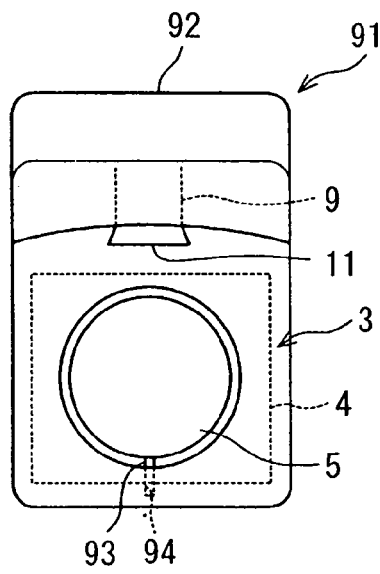
FIG. 13A is a diagram illustrating a front view of an optical sensor unit according to another modification.
Figure 13B:
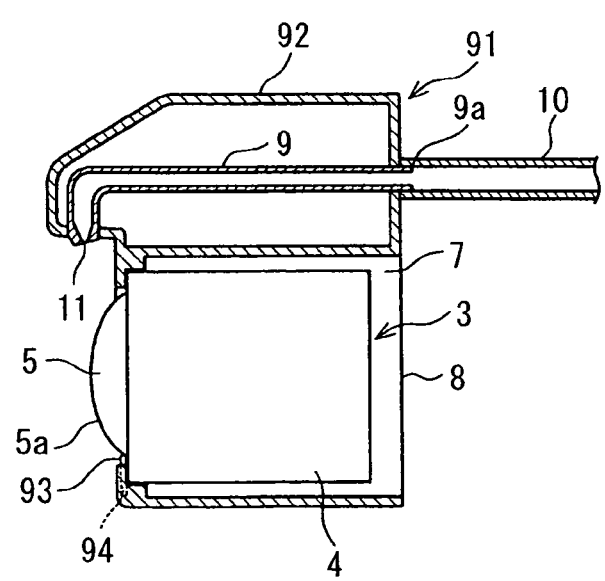
FIG. 13B is a diagram illustrating a cross-sectional side view of the optical sensor unit of FIG. 13A.

The position where the water accumulates in the bottom edge of the lens surface 5a varies depending on the curvature and diameter of the lens 5. For this reason, as shown in FIGS. 13A and 13B, a casing 92 of a camera cover 91 can be provided with a projection 93. The projection 93 can be located at the position near the bottom edge of the lens surface 5a of the lens 5 of the camera 3 and move up and down along a slot 94. For example, when the diameter of the lens 5 is large, the projection 93 can be caused to move down, and when the diameter of the lens 5 is small, the projection 93 can be caused to move up. In this way, by causing the projection 93 to move up and down, the projection 93 can suitably come in contact with the water regardless of the curvature and diameter of the lens 5. For example, the projection 93 can be provided with a male screw portion, and the slot 94 can be provided with a female screw portion. The male screw portion and the female screw portion are engaged with each other so that the projection 93 can move up and down along the slot 94.

Figure 14A:
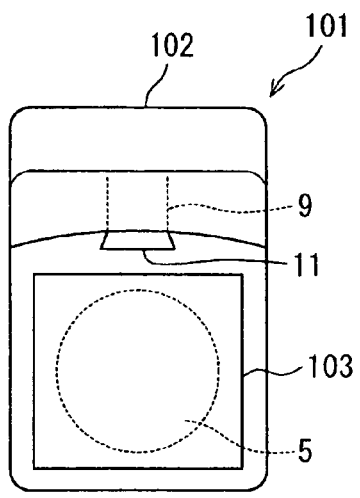
FIG. 14A is a diagram illustrating a front view of an optical sensor unit according to another modification.
Figure 14B:
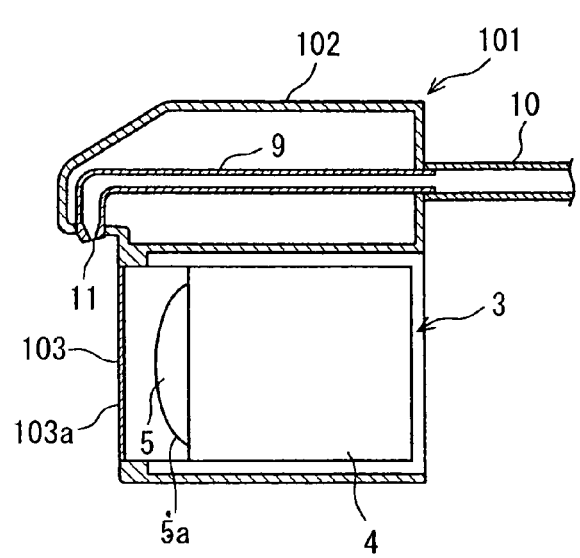
FIG. 14B is a diagram illustrating a cross-sectional side view of the optical sensor unit of FIG. 14A.

As shown in FIGS. 14A and 14B, a casing 102 of a camera cover 101 can be provided with a transparent cover glass 103. The cover glass 103 can be located on the front side of the casing 102 so as to face the lens 5 of the camera 3. The washer fluid supplied from the washer fluid tank 15 to the washer nozzle 9 through the tube 10 can be splayed from the spray opening 11 onto a glass surface 103a of the cover glass 103. In this case, since the entire camera 3 is held the casing 102, a size of the casing 102 in a front-rear direction (from a front side to a rear side) of the casing 102 is greater than a size of the casing 6 of the first and second embodiments. In such an approach, the cover glass 103 protects the lens 5 of the camera 3, and the washer fluid is suitably sprayed onto the glass surface 103a so that foreign matters sticking to the glass surface 103a can be suitably removed. Thus, the camera 3 can suitably work so as to capture a suitable image of the subject.

Figure 15A:
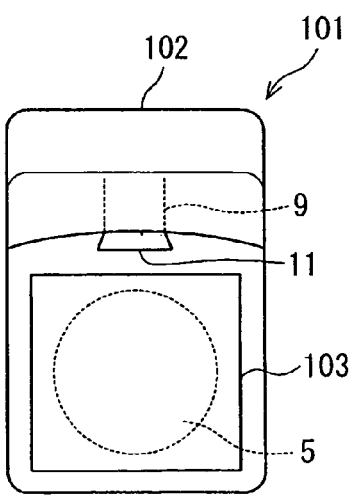
FIG. 15A is a diagram illustrating a front view of an optical sensor unit according to another modification.
Figure 15B:
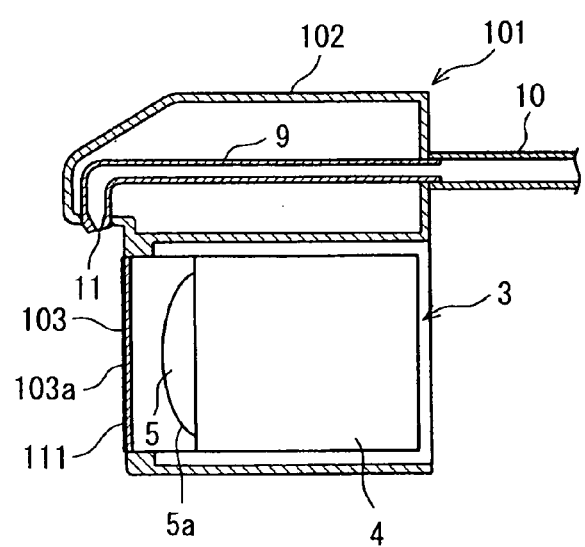
FIG. 15B is a diagram illustrating a cross-sectional side view of the optical sensor unit of FIG. 15A.

As shown in FIGS. 15A and 15B, a water-repellent treatment can be applied to the glass surface 103a of the cover glass 103 so that the glass surface 103a can be coated with a water-repellent layer 111. Alternatively, a hydrophilic treatment, a photocatalytic treatment, or an antifouling treatment can be applied to the glass surface 103a so that the glass surface 103a can be coated with a hydrophilic layer, a photocatalytic layer, or an antifouling layer. In such an approach, it is possible to prevent foreign matters such as water and dirt from sticking to the glass surface 103a. Further, even if foreign matters such as water and dirt stick to the glass surface 103a, the washing operation of the washer nozzle 9 is performed so that the glass surface 103a can be suitably washed.

As shown in FIGS. 16A and 16B, a casing 122 of a camera cover 121 can be provided with a wiping mechanism 125 (a wiping device in the present invention). The wiping mechanism 125 includes a wiper 123 for wiping the glass surface 103a of the cover glass 103 and a motor 124 for driving the wiper 123. The wiping mechanism 125 can wipe the glass surface 103a of the cover glass 103, while or after the washer fluid is sprayed onto the glass surface 103a of the cover glass 103 from the spray opening 11 of the washer nozzle 9. In such an approach, it is possible to prevent the washer fluid from remaining sticking to the glass surface 103a of the cover glass 103. Alternatively, if the cover glass 103 is not included, a wiping mechanism for wiping the lens surface 5a of the lens 5 of the camera 3 can be included.

As shown in FIGS. 17A and 17B, a casing 132 of a camera cover 131 can be provided with a rotating mechanism 135 (a rotating device in the present invention). The rotating mechanism 135 includes a sealed bearing 133 and a motor 134 for causing the cover glass 103 to rotate. The rotating mechanism 135 can cause the cover glass 103 to rotate, while or after the washer fluid is sprayed from the spray opening 11 of the washer nozzle 9 onto the glass surface 103a of the cover glass 103. In such an approach, while the cover glass 103 rotates, the washer fluid sticking to the glass surface 103a of the cover glass 103 can be blown off. Therefore, it is possible to prevent the washer fluid from remaining sticking to the glass surface 103a of the cover glass 103. In this case, for example, if a person touches the cover glass 103, the rotation is interfered so that its full potential of removing the washer fluid cannot be used. To prevent this, the rotating mechanism 135 can cause the cover glass 103 to rotate on the condition that a vehicle speed is greater than or equal to a predetermined speed (for example, 1 That is, typically, a person outside a vehicle can approach a vehicle, when the vehicle is parked or stopped. Therefore, when the vehicle is parked or stopped, there is a possibility that the person will accidentally touch the cover glass 103. However, the person does not approach the vehicle, when the vehicle is running. Therefore, when the vehicle is running, there is no possibility that the person will accidentally touch the cover glass 103. For the foregoing reasons, the rotating mechanism 135 can be configured to cause the cover glass 103 to rotate on the condition that the vehicle speed is greater than or equal to the predetermined speed. In such an approach, it is possible to prevent a reduction in the washer fluid removing potential due to a touch of the person outside the vehicle.

If the cover glass 103 is located where, such as at a door mirror, an occupant of the vehicle can reach it, it is preferable to take measures to prevent the occupant from touching it. For this reason, the rotating mechanism 135 can be configured to cause the cover glass 103 to rotate on the condition that the window is closed. In such an approach, it is possible to prevent a problem caused by a touch of the occupant to the cover glass 103 that is rotating. In this case, it is not always necessary that the window should be closed. It does no matter if the window is slightly opened, as long as the window is closed to a position that can prevent a user from touching the cover glass 103 by leaning out of the window. In this case, air can be introduced through the window. The position to which the window should be closed can be determined based on a relationship between where the cover glass 103 is located in the vehicle and how much a user can lean out of the window.

Figure 18A:
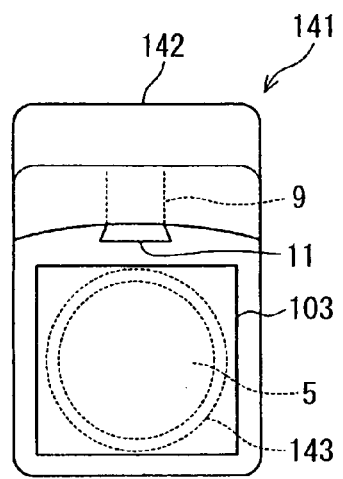
FIG. 18A is a diagram illustrating a front view of an optical sensor unit according to another modification.
Figure 18B:
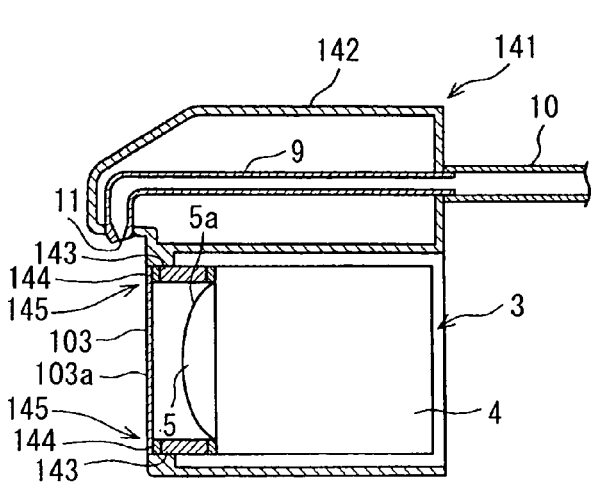
FIG. 18B is a diagram illustrating a cross-sectional side view of the optical sensor unit of FIG. 18A.

As shown in FIGS. 18A and 18B, a casing 142 of a camera cover 141 can be provided with a vibrating mechanism 145 (an ultrasonic vibration device or a subsonic vibration device in the present invention). The vibrating mechanism 145 includes a piezoelectric device 143 and an electrode 144 for generating ultrasonic wave or subsonic wave that causes the cover glass 103 to vibrate. The vibrating mechanism 145 can cause the cover glass 103 to vibrate, while or after the washer fluid is sprayed from the spray opening 11 of the washer nozzle 9 onto the glass surface 103a of the cover glass 103. In such an approach, it is possible to prevent the washer fluid from remaining sticking to the glass surface 103a of the cover glass 103.

Figure 19A:
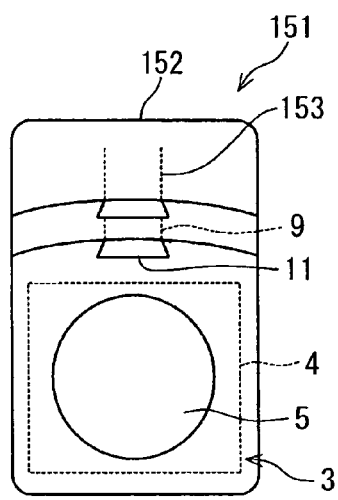
FIG. 19A is a diagram illustrating a front view of an optical sensor unit according to another modification.
Figure 19B:
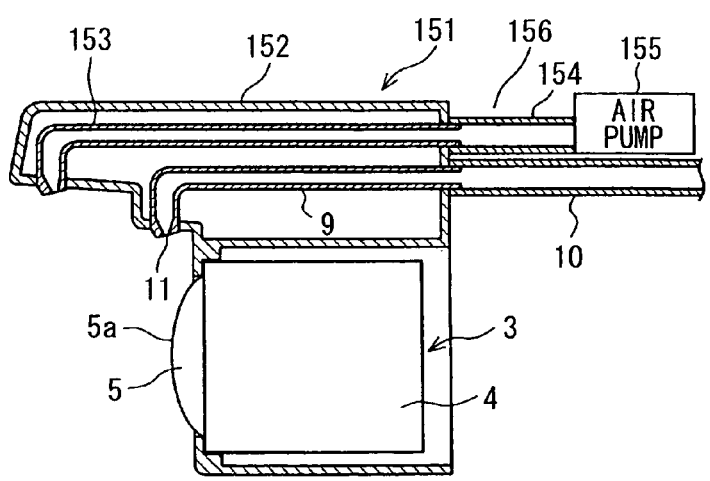
FIG. 19B is a diagram illustrating a cross-sectional side view of the optical sensor unit of FIG. 19A.

As shown in FIGS. 19A and 19B, a casing 152 of a camera cover 151 can be provided with an air spraying mechanism 156 (an air spraying device in the present invention). The air spraying mechanism 156 includes an air nozzle 153, a tube 154, and an air pump 155 for spraying air onto the glass surface 103a of the cover glass 103. The air spraying mechanism 156 can spray air onto the glass surface 103a of the cover glass 103, while or after the washer fluid is sprayed from the spray opening 11 of the washer nozzle 9 onto the glass surface 103a of the cover glass 103. In such an approach, it is possible to prevent the washer fluid from remaining sticking to the glass surface 103a of the cover glass 103.

The wiping mechanism 125 explained in FIGS. 16A and 16B, the rotating mechanism 135 explained in FIGS. 17A and 17B, the vibrating mechanism 145 explained in FIGS. 18A and 18B, and the air spraying mechanism 156 explained in FIGS. 19A and 19B can be configured to work in accordance with an operating status of a vehicle wiper. The wiping mechanism 125, the rotating mechanism 135, the vibrating mechanism 145, and the air spraying mechanism 156 can operate during a period of time when the vehicle wiper operates. In such an approach, it is possible to prevent raindrops from sticking to the lens surface 5a or the glass surface 103a. Further, even if raindrops stick to the lens surface 5a or the glass surface 103a, the raindrops can be removed.

Figure 20:
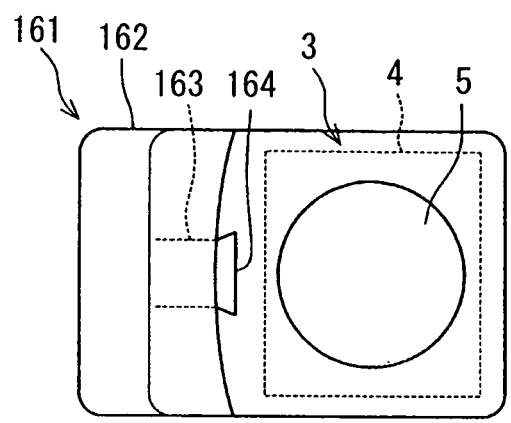
FIG. 20 is a diagram illustrating a front view of an optical sensor unit according to another modification.

As shown in FIG. 20, a washer nozzle 163 can be located in a casing 162 of a camera cover 161 on the side of the camera 3. The washer fluid stored in the washer fluid tank 15 can be supplied to the washer nozzle 163 through the tube 10, and the washer fluid supplied to the washer nozzle 163 can be splayed from a spray opening 164 onto the lens surface 5a of the lens 5 from the side. In this case, the washer nozzle 163 extends over the entire casing 162 like the washer nozzle 9, which is explained in FIGS. 1A and 1B and extends over the entire casing 6. In such an approach, since the washer nozzle 163 is located on the side of the camera 3, the on-board optical sensor apparatus can be reduced in size in a height direction. It is noted that the on-board optical sensor apparatus may be mounted on the vehicle in a manner shown in FIGS. 1A and 1B or FIG. 20 according to types of vehicles in terms of mounting position limited by vehicle structure and appearance required by vehicle makers. According to this embodiment, the on-board optical sensor apparatus can be vertically or horizontally mounted on the vehicle according to types of vehicles.

Figure 21:
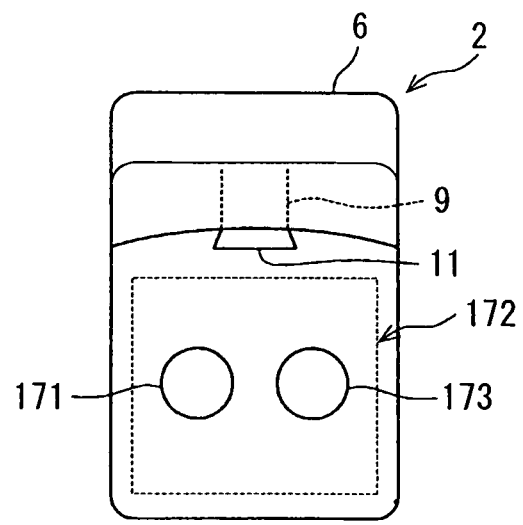
FIG. 21 is a diagram illustrating a front view of an optical sensor unit according to another modification.
Figure 22:
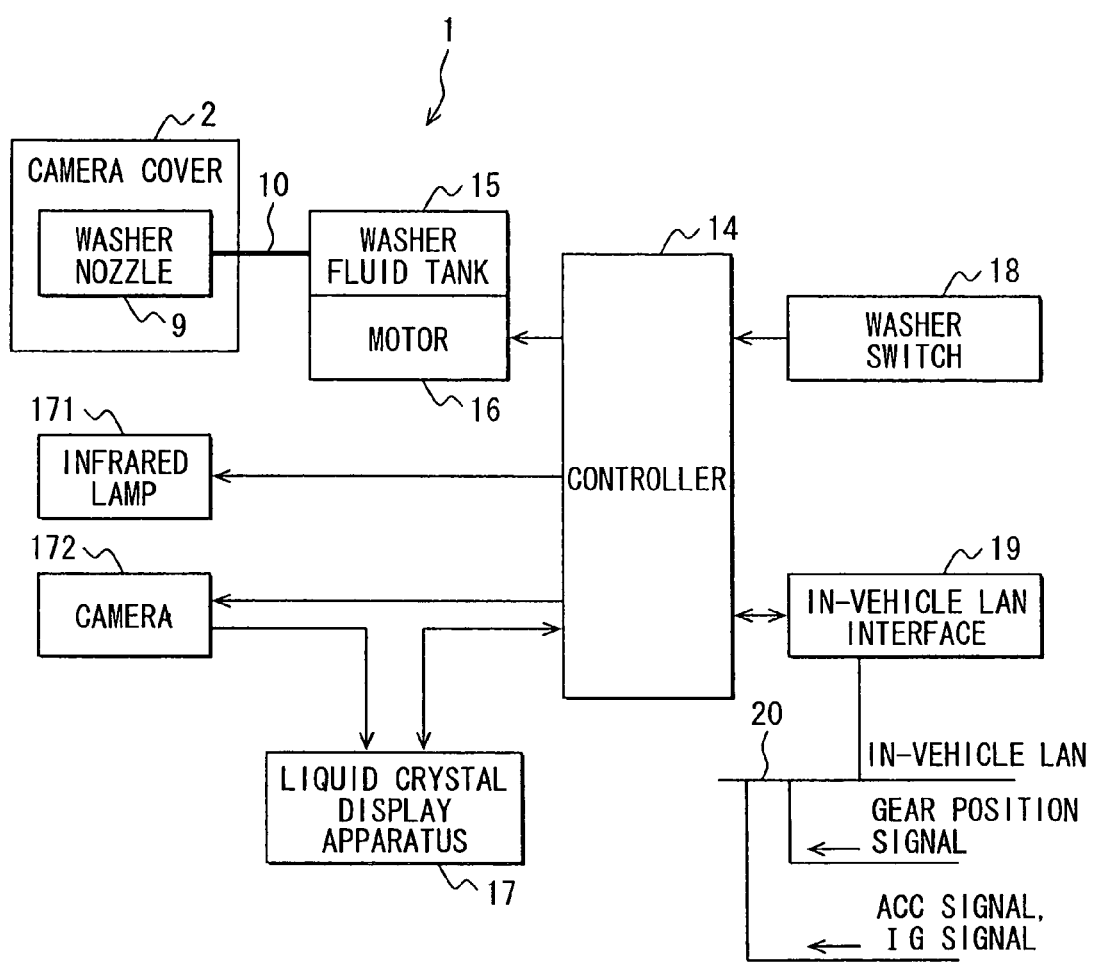
FIG. 22 is a functional diagram of the optical sensor unit of FIG. 21.

As shown in FIGS. 21 and 22, a camera 172 into which an infrared lamp 171 (a lighting device in the present invention) is integrated can be included. The washer fluid stored in the washer fluid tank 15 can be supplied to the washer nozzle 9 and splayed from the spray opening 11 onto not only a lens surface of a lens 173 of the camera 172 but also the infrared lamp 171. For example, the infrared lamp 171 can be used to assist the ambient brightness, when the camera 3 captures an image at night. According to the embodiment shown in FIGS. 21 and 22, foreign matters sticking to a lens of the infrared lamp 171 are suitably removed so that infrared light can be suitably radiated. Alternatively, in FIGS. 21 and 22, the infrared lamp 171 can be replaced with a visible-light lamp (a lighting device in the present invention). Even the visible-light lamp can produce the same effect as the infrared lamp 171.

Figure 23A:
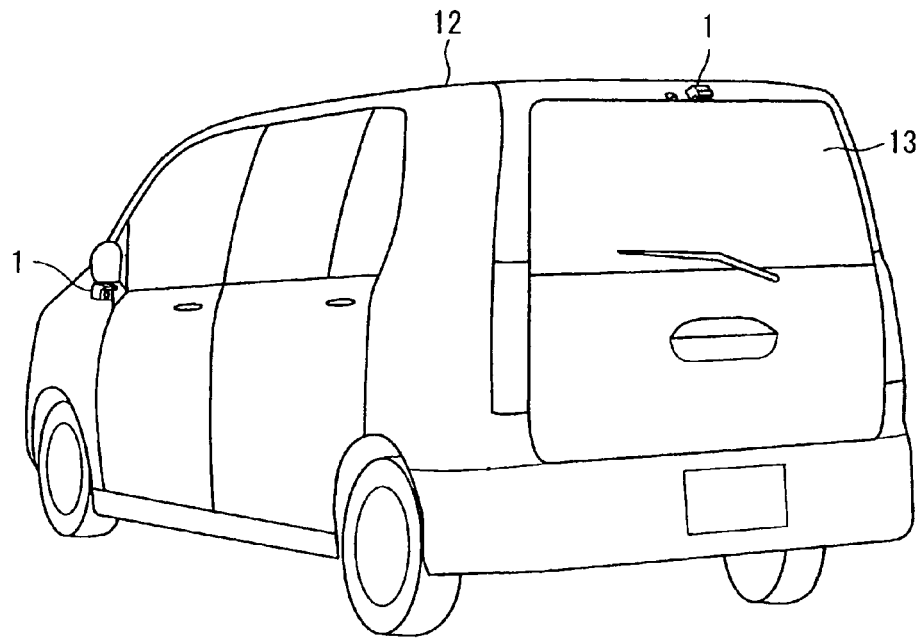
FIGS. 23A and 23B are diagrams illustrating a perspective view of a vehicle equipped with an optical sensor unit according to another modification.
Figure 23B:
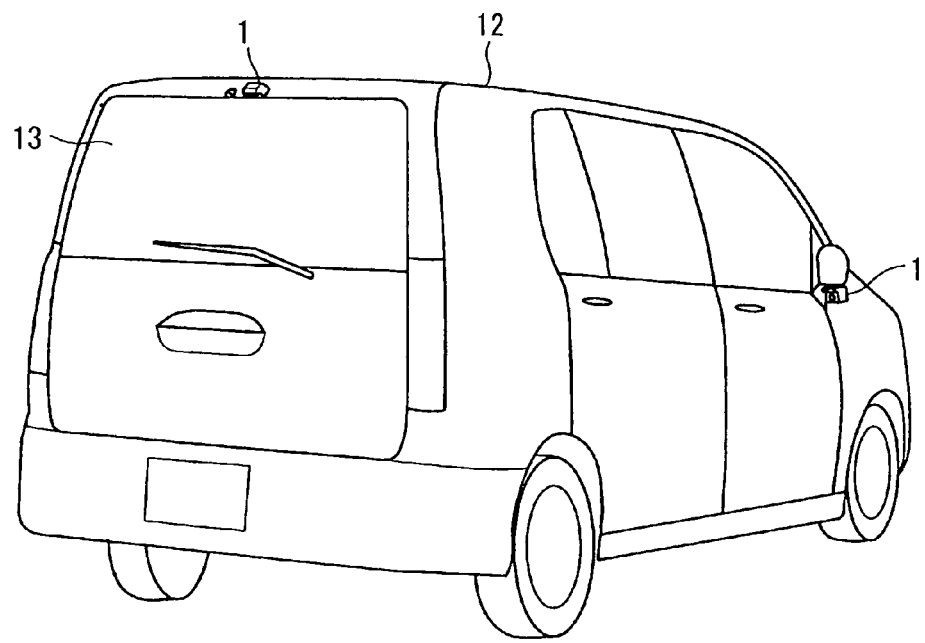

As shown in FIGS. 23A and 23B, the optical sensor unit 1 can be located not only above the rear window 13 of the vehicle body 12 but also below a side mirror attached to the side of the vehicle. In such an approach, the camera 3 can capture an image of the area behind and beside the vehicle. That is, multiple cameras can be mounted.

Any two or more of the above embodiments can be combined together. For example, the pan 63 explained in FIGS. 10A and 10B, the canopy 73 explained in FIGS. 11A and 11B, and the wiping mechanism 125 explained in FIGS. 16A and 16B can be included at the same time.

In the above embodiments, the on-board optical sensor apparatus includes the controller and the optical sensor unit. Alternatively, the camera cover can include the controller.

Third Embodiment

Figure 24A:
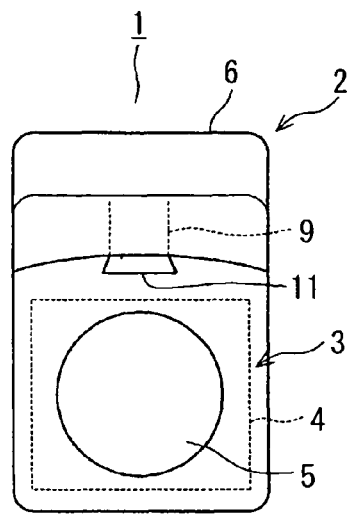
FIG. 24A is a diagram illustrating a front view of an optical sensor unit according to a third embodiment of the present invention.
Figure 24B:
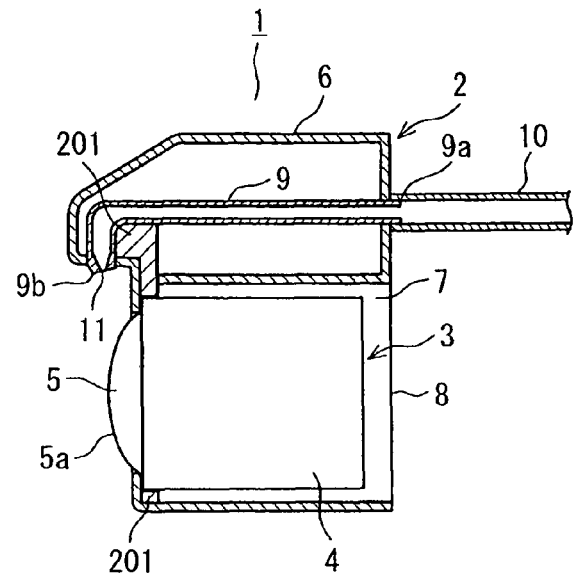
FIG. 24B is a diagram illustrating a cross-sectional side view of the optical sensor unit of FIG. 24A.
Figure 25:
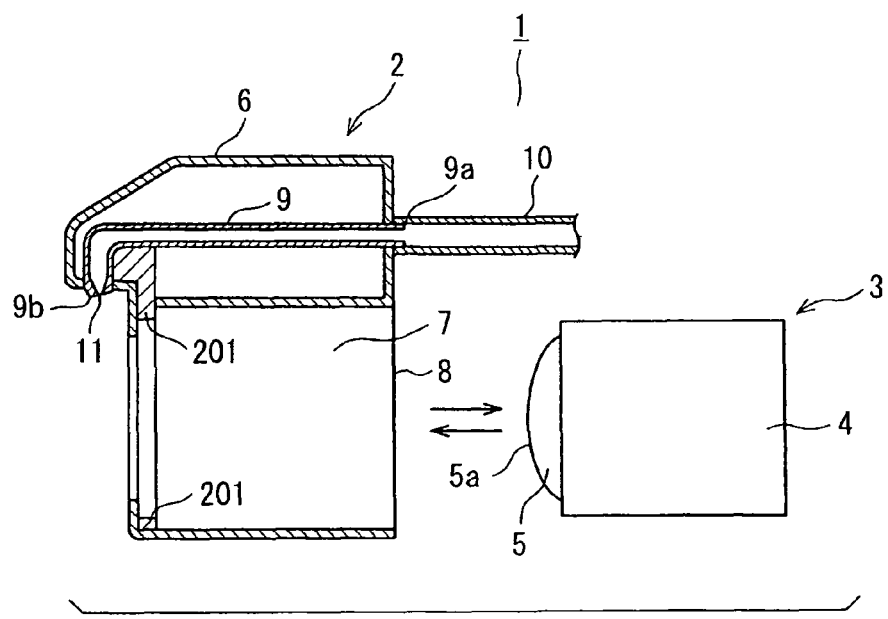
FIG. 25 is a diagram illustrating a manner in which a camera cover and a camera of the optical sensor unit according to the third embodiment are separated from each other.

A third embodiment of the present invention is described below with reference to FIGS. 24A-27. The third embodiment differs from the first embodiment in the following points. As shown in FIGS. 24A and 24B, a heater 201 (an optical heating device and a nozzle heating device, which are integrally formed from the same member, in the present invention) and a wire (not shown) for supplying an electric current to the heater 201 are located in the casing 6. In the condition where the camera 3 is normally held in the holder 7, the heater 201 covers the entire side periphery of the lens 5 of the camera 3 and is in contact with a portion (near a curved portion in the present embodiment) of the washer nozzle 9 on the tip end 9b side. For example, the heater 201 can be a mesh of hot wires. Heat generated by the heater 201 is transmitted to the lens 5 of the camera 3 and the portion of the washer nozzle 9 on the tip end 9b side.

Figure 26:
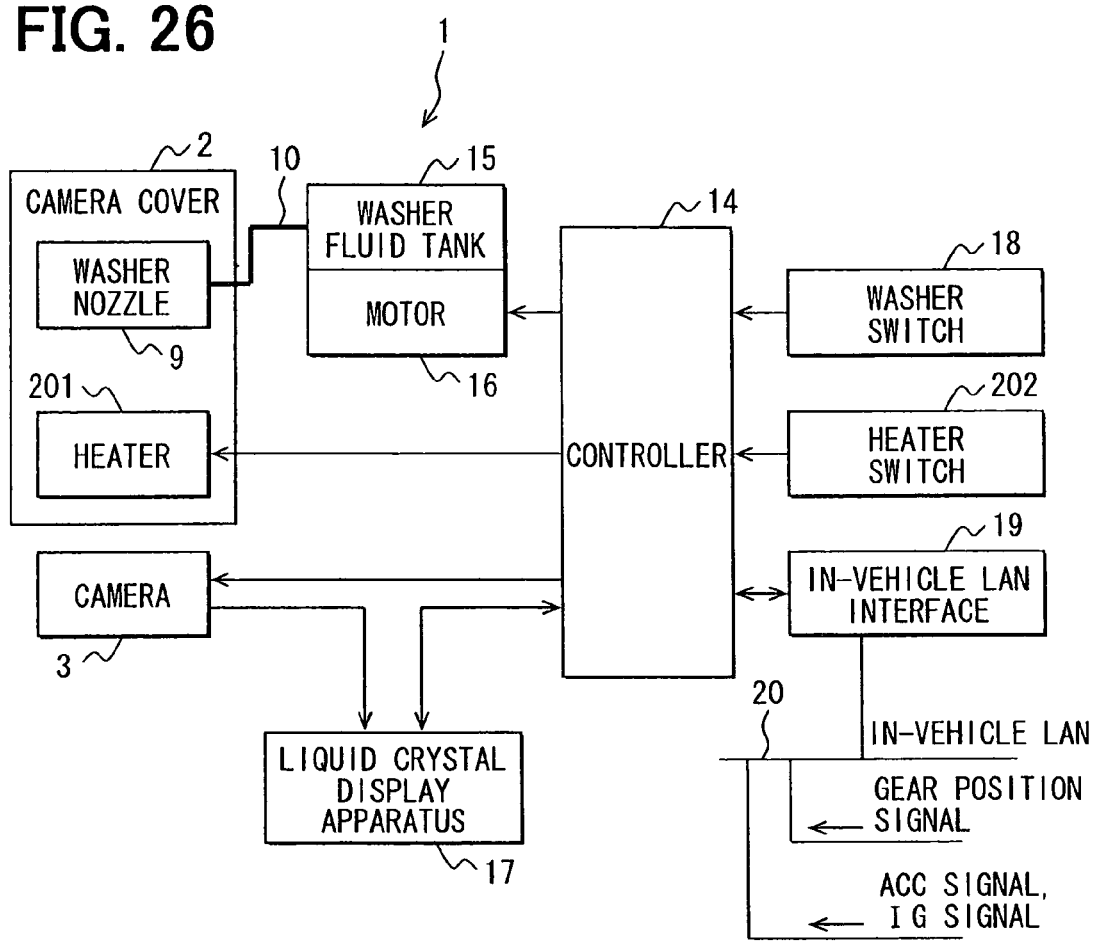
FIG. 26 is a functional diagram of the optical sensor unit according to the third embodiment.

FIG. 26 is a functional block diagram illustrating an electrical configuration of peripheral circuitry including the optical sensor unit 1. The controller 14 mainly includes a microcomputer. The controller 14 executes a prestored control program, thereby controlling the capture operation of the camera 3, controlling a heat operation of the heater 201, and controlling the operation of the motor 16 installed in the washer fluid tank 15 so as to control the washing operation of the washer nozzle 9. A heater switch 202 is operable by a user. When a user operates the heater switch 202, the heater switch 202 outputs an operation detection signal to the controller 14. When receiving the operation detection signal outputted from the heater switch 202, the controller 14 outputs a drive command signal to the heater 201, thereby driving the heater 201. The drive command signal outputted from the controller 14 to the motor 16 and the drive command signal outputted from the controller 14 to the heater 201 are level signals. The washing operation of the washer nozzle 9 and the heat operation of the heater 201 are performed only during a period of time where the level signals are ON (High level). The washer switch 18 and the heater switch 202 can be mechanical switches or touch switches displaced on the liquid crystal display apparatus 17.

An action of the above configuration is described below with reference to FIG. 27.

In a power-ON state (in a driven state of the optical sensor unit 1), the controller 14 determines whether the washer switch 18 is operated (step S101) and determines whether the heater switch 202 is operated (step S102). When the controller 14 receives the operation detection signal outputted from the washer switch 18 and determines that the washer switch 18 is operated ("YES" at step S101), the controller 14 outputs the drive commend signal to the motor 16 to drive the motor 16, thereby performing the washing operation of the washer nozzle 9 (step S103). That is, the washer fluid stored in the washer fluid tank 15 is supplied to the washer nozzle 9 and splayed from the spray opening 11 onto the lens surface 5a of the lens 5 of the camera 3 (step S103). In this case, the controller 14 can continue the washing operation of the washer nozzle 9 only for a predetermined period of time (for example, a few seconds). Alternatively, the controller 14 can continue the washing operation of the washer nozzle 9 only while a user is operating (for example, pressing) the washer switch 18. Further, if a function of measuring the amount of the washer fluid is included, the washing operation of the washer nozzle 9 can be continued only until the amount of the splayed washer fluid reaches a predetermined amount.

Further, when the controller 14 receives the operation detection signal outputted from the heater switch 202 and determines that the heater switch 202 is operated ("YES" at step S102), the controller 14 outputs the drive commend signal to the heater 201 to drive the heater 201, thereby driving the heating operation of the heater 201 (step S104). That is, the heat generated by the heater 201 is transmitted to the entire side periphery of the lens 5 of the camera 3 and also transmitted to the tip end 9b side of the washer nozzle 9. In this case, the controller 14 can continue the heating operation of the heater 201 only for a predetermined period of time. Alternatively, the controller 14 can continue the heating operation of the heater 201 only while a user is operating (for example, pressing) the heater switch 202. The controller 14 repeats the above steps S101-S104.

As described above, according to the third embodiment, the heater 201 can heat not only the lens 5 of the camera 3 but also the washer nozzle 9. Even when the ambient temperature decreases, the lens 5 of the camera 3 can be heated to prevent the lens surface 5a of the lens 5 of the camera 3 from fogging and to prevent water on the lens surface 5a from freezing. Further, the washer nozzle 9 can be heated to prevent the washer fluid from freezing. Thus, the washer fluid can be suitably sprayed onto the lens surface 5a so that foreign matters sticking to the lens surface 5a can be suitably removed. Therefore, the camera 3 can suitably work.

Fourth Embodiment

A fourth embodiment of the present invention is described below with reference to FIGS. 28 and 29. The fourth embodiment differs from the third embodiment in the following points.

Figure 28:
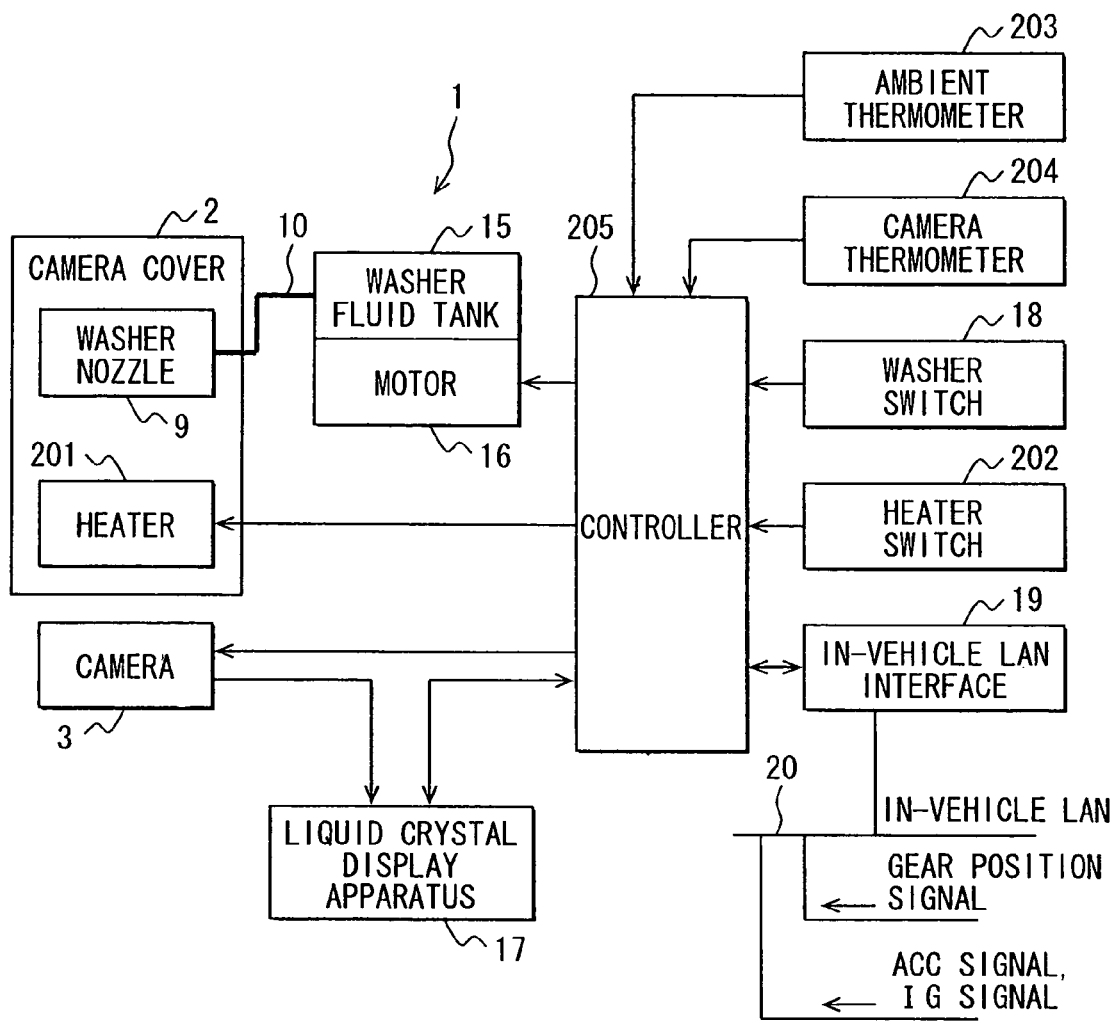
FIG. 28 is a functional diagram of an optical sensor unit according to a fourth embodiment of the present invention.

According to the fourth embodiment, as shown in FIG. 28, an ambient thermometer 203 (an ambient temperature measuring device in the present invention) for measuring an ambient temperature and a camera thermometer 204 (a sensor temperature measuring device, in the present invention) for measuring a temperature of the camera 3 are included. When receiving a temperature measurement signal outputted from the ambient thermometer 203, a controller 205 detects the ambient temperature by analyzing the received temperature measurement signal. When receiving a temperature measurement signal outputted from the camera thermometer 204, the controller 205 detects the temperature of the camera 3 by analyzing the received temperature measurement signal. It is noted that the controller 205 has a counting function.

In FIG. 29, in a power-ON state (in a driven state of the optical sensor unit 1), the controller 205 determines whether any of the operating conditions is satisfied (step S111) and determines whether the image contains dirt (step S112). Then, if the controller 205 determines that any of the operating conditions is satisfied, i.e., determines that the gear is shifted into the reverse position, the IG switch is switched from the OFF state to the ON state, or the IG switch is switched from the ON state to the OFF state ("YES" at step S111), or if the controller 205 determines that the image contains dirt ("YES" at step S112), the controller 205 determines whether the ambient temperature or the temperature of the camera 3 is equal to or greater than a predetermined temperature (step S113).

Then, if the controller 205 determines that the ambient temperature or the temperature of the camera 3 is less than the predetermined temperature ("NO" at step S113), the controller 205 drives the heater 201 so as to perform the heating operation of the heater 201 only for a predetermined period of time (step S114). Then, the controller 205 increments (addition of "1") a heating number counter (step S115) and determines whether a value of the incremented heating number counter is less than a predetermined number (step S116). If the controller 205 determines that the value of the incremented heating number counter is less than the predetermined number ("YES" at step S116), the controller 205 returns to step S113 and repeats the steps subsequent to step S113. In contrast, if the controller 205 determines that the value of the incremented heating number counter is equal to or greater than the predetermined number ("NO" at step S116), the controller 205 causes the liquid crystal display apparatus 17 to display an error display indicating that the heating operation of the heater 201 was repeated the predetermined number of times (step S117). Then, the controller 205 resets the value of the heating number counter (step S118) and finishes the series of procedures.

If the controller 205 determines that the ambient temperature or the temperature of the camera 3 is equal to or greater than the predetermined temperature ("YES" at step S113), the controller 205 drives the motor 16 so as to perform the washing operation of the washer nozzle 9 for a predetermined period of time (step S119). Then, the controller 205 increments (addition of "1") a washing number counter (step S120) and determines whether a value of the incremented washing number counter is less than a predetermined number (step S21). If the controller 205 determines that the value of the incremented washing number counter is less than the predetermined number ("YES" at step S121), the controller 205 returns to step S112 and repeats the steps subsequent to step S112. In contrast, if the controller 205 determines that the value of the incremented washing number counter is equal to or greater than the predetermined number ("NO" at step S121), the controller 205 causes the liquid crystal display apparatus 17 to display an error display indicating that the washing operation of the washer nozzle 9 was performed the predetermined number of times (step S122). Then, the controller 205 resets the value of the washing number counter (step S123) and finishes the series of procedures.

If the controller 205 determines that the image contains no dirt (dirt is removed as a result of the washing operation of the washer nozzle 9) ("NO" at step S112), the controller 205 resets not only the value of the heating number counter but also the value of the washing number counter (step S124) and returns to step S11 and repeats the steps subsequent to step S111.

As described above, according to the fourth embodiment, the lens surface 5a of the lens 5 of the camera 3 can be automatically washed whenever it is detected that the gear of the vehicle is shifted into the reverse position, the IG switch is switched from the OFF state to the ON state, the IG switch is switched from the ON state to the OFF state, or the image contains dirt. Further, the error display is displayed when the value of the heating number counter or the washing number counter becomes equal to or greater than the predetermined number. Alternatively, if a function of measuring the heating time or the washing time is included, the error display can be displayed when the heating time or the washing time reaches a predetermined time.

The above embodiment can be modified and extended as follows. A heater for heating the lens 5 of the camera 3 can be provided separately from a heater for heating the washer nozzle 9.

In the embodiment, the heater 201 is configured to heat both the lens 5 of the camera 3 and the washer nozzle 9 by itself. Alternatively, the heater 201 can be configured to heat any one of the lens 5 of the camera 3 and the washer nozzle 9.

Assuming that the heater 201 is configured to heat the lens 5 of the camera 3, the lens 5 of the camera 3 is heated by the heater 201 upon decrease in ambient temperature so as to prevent the lens surface 5a of the lens 5 of the camera 3 from fogging. Therefore, the camera 3 can suitably work so as to capture a suitable image of the subject.

Assuming that the heater 201 is configured to heat the washer nozzle 9, the washer nozzle 9 is heated by the heater 201 upon decrease in ambient temperature so as to prevent the washer fluid from freezing. Thus, the washer fluid can be suitably sprayed onto the lens surface 5a so that foreign matters sticking to the lens surface 5a can be suitably removed. Therefore, the camera 3 can suitably work so as to capture a suitable image of the subject.

In the embodiment, the error display is displayed on the liquid crystal display apparatus 17 when the value of the heating number counter or the washing number counter becomes equal to or greater than the predetermined number. Alternatively, in such a case, an error surround can be outputted from a speaker, or vibration or static electricity can be generated from a seat or a handle by a static electricity generator or a vibration generator mounted to the seat or the handle. Alternatively, these can be used in combination with each other. That is, reporting can be performed through any of the sense of sight, the sense of hearing, and the sense of touch.

Figure 27:
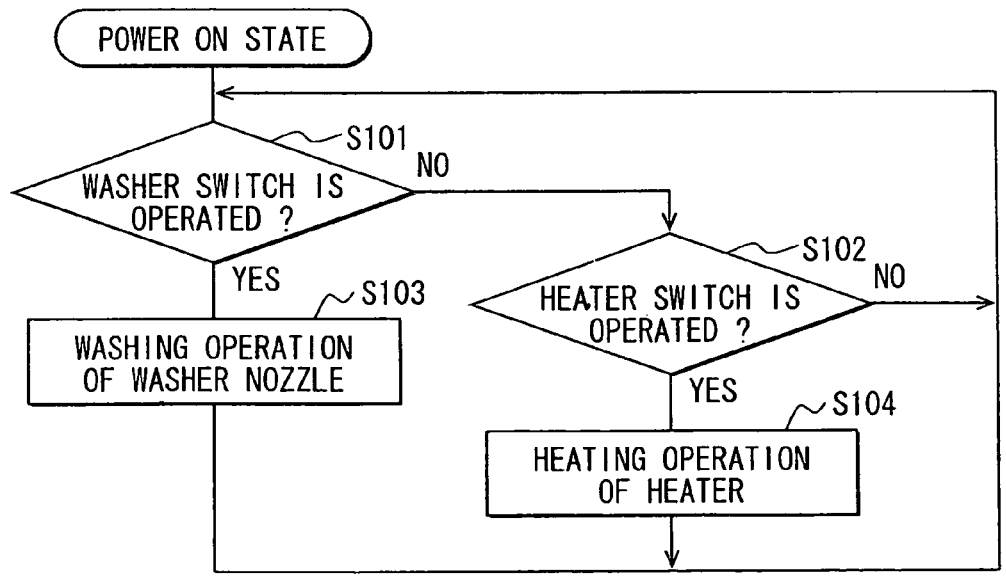
FIG. 27 is a flow chart of the optical sensor unit according to the third embodiment.

The configuration shown in FIG. 27 in which the washing operation of the washer nozzle 9 is manually performed can be used in combination with the configuration shown in FIG. 29 in which the washing operation of the washer nozzle 9 is automatically performed.

As shown in FIGS. 30A and 30B, like the configuration shown in FIGS. 8A and 8B, even when the heater 201 is included, a water-repellent treatment can be applied to the lens surface 5a of the lens 5 of the camera 3 so that the lens surface 5a can be coated with the water-repellent layer 41. Alternatively, a hydrophilic treatment, a photocatalytic treatment, or an antifouling treatment can be applied to the lens surface 5a so that the lens surface 5a can be coated with a hydrophilic layer, a photocatalytic layer, or an antifouling layer:

As shown in FIGS. 31A and 31B, like the configuration shown in FIGS. 9A and 9B, even when the heater 201 is included, the casing 52 of the camera cover 51 can be provided with the window washer nozzle 53 that is arranged parallel to the washer nozzle 9. The washer fluid stored in the washer fluid tank 15 can be supplied to the window washer nozzle 53 through the tube 54, and the washer fluid supplied to the window washer nozzle 53 can be splayed from the spray opening 55 onto the window.

As shown in FIGS. 32A and 32B, like the configuration shown in FIGS. 10A and 10B, even when the heater 201 is included, the casing 62 of the camera cover 61 can be provided the pan 63 and the tube 64. When the washer fluid is sprayed from the splay opening 11 of the washer nozzle 9 onto the lens surface 5a of the lens 5 of the camera 3, the pan 63 can catch, the washer fluid dripping from the lens surface 5a, and the washer fluid caught by the pan 63 can be drained through the tube 64.

As shown in FIGS. 33A and 33B, like the configuration shown in FIGS. 11A and 11B, even when the heater 201 is included, the casing 72 of the camera cover 71 can be provided with the canopy 73.

As shown in FIGS. 34A and 34B, like the configuration shown in FIGS. 14A and 14B, even when the heater 201 is included, the casing 102 of the camera cover 101 can be provided with the transparent cover glass 103. The cover glass 103 can be located on the front side of the casing 102 so as to face the lens 5 of the camera 3. The washer fluid supplied from the washer fluid tank 15 tope washer nozzle 9 through the tube 10 can be splayed from the spray opening 11 onto the glass surface 103a of the cover glass 103.

In this case, a heater 301 covers the entire side periphery of the cover glass 103 and is in contact with the portion of the washer nozzle 9 on the tip end 9b side. Heat generated by the heater 301 can be transmitted to the cover glass 103 and the portion of the washer nozzle 9 on the tip end 9b side. Further, since the entire camera 3 is held in the casing 102, a size of the casing 102 in a front-rear direction (from a front side to a rear side) of the casing 102 is greater than a size of the casing 6 of the third embodiment. In such an approach, while the cover glass 103 protects the lens 5 of the camera 3, the glass surface 103a of the cover glass 103 can be prevented from fogging. Further, the washer fluid can be prevented from freezing. Thus, the washer fluid can be suitably sprayed onto the glass surface 103a so that foreign matters stickling to the glass surface 103a can be suitably removed. Therefore, the camera 3 can suitably work so as to capture a suitable image of the subject.

As shown in FIGS. 35A and 35B, like the configuration shown in FIGS. 15A and 15B, even when the heater 301 is included, a water-repellent treatment can be applied to the glass surface 103a of the cover glass 103 so that the glass surface 103a can be coated with the water-repellent layer 111. Alternatively, a hydrophilic treatment, a photocatalytic treatment, or an antifouling treatment can be applied to the glass surface 103a so that the glass surface 103a can be coated with a hydrophilic layer, a photocatalytic layer, or an antifouling layer.

Figure 36A:
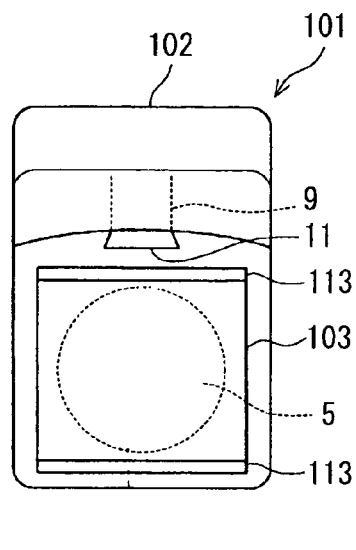
FIG. 36A is a diagram illustrating a front view of an optical sensor unit according to another modification.
Figure 36B:
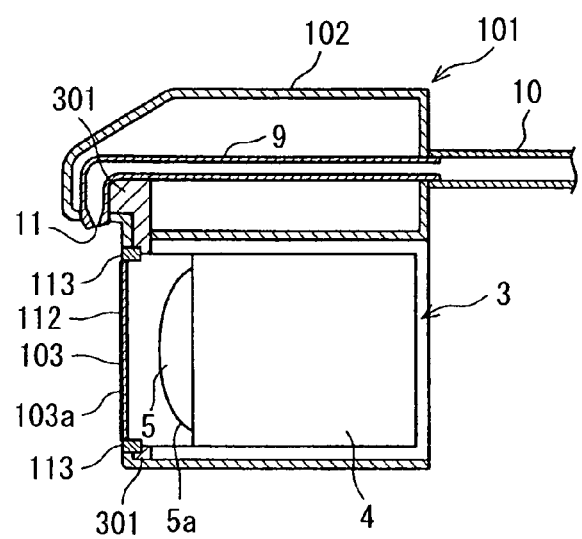
FIG. 36B is a diagram illustrating a cross-sectional side view of the optical sensor unit of FIG. 36A.

As shown in FIGS. 36A and 36B, in the casing 102 of the camera cover 101, the glass surface 103a of the cover glass 103 can be coated with indium tin oxide 112, and an electrode 113 can be provided on a top side portion and a bottom side portion of the cover glass 103. A predetermined voltage can be applied to the electrode 113 so that an electric current can flow through the indium tin oxide 112. As a result, the indium tin oxide 112 generates heat so that the cover glass 103 can be heated. Alternatively, the lens surface 5a of the lens 5 of the camera 3 can be coated with indium tin oxide, and an electrode provided in the camera 3 can cause the indium tin oxide to generate heat so that the lens 5 can be heated.

Figure 37A:
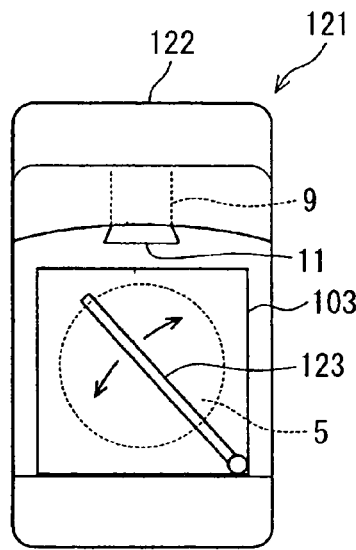
FIG. 37A is a diagram illustrating a front view of an optical sensor unit according to another modification.
Figure 37B:
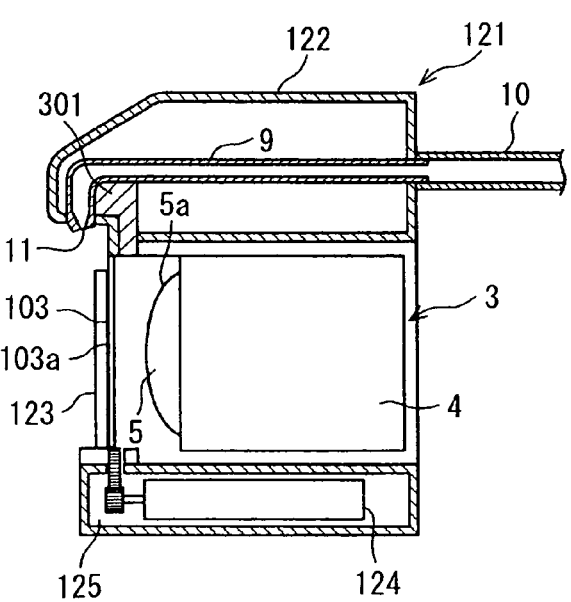
FIG. 37B is a diagram illustrating a cross-sectional side view of the optical sensor unit of FIG. 37A.

As shown in FIGS. 37A and 37B, like the configuration shown in FIGS. 16A and 16B, even when the heater 301 is included, the casing 122 of the camera cover 121 can be provided with the wiping mechanism 125 including the wiper 123 for wiping the glass surface 103a of the cover glass 103 and the motor 124 for driving the wiper 123. The wiping mechanism 125 can wipe the glass surface 103a of the cover glass 103, while or after the washer fluid is sprayed from the spray opening 11 of the washer nozzle 9 onto the glass surface 103a of the cover glass 103.

Figure 38A:
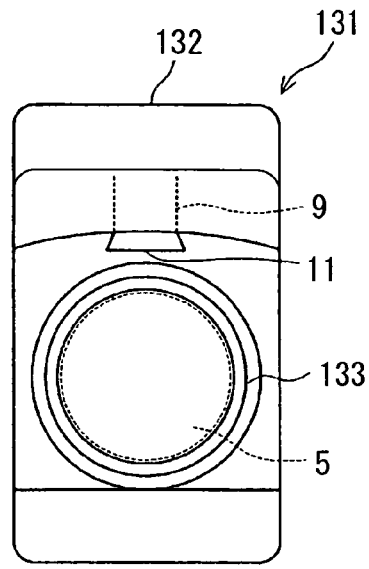
FIG. 38A is a diagram illustrating a front view of an optical sensor unit according to another modification.
Figure 38B:
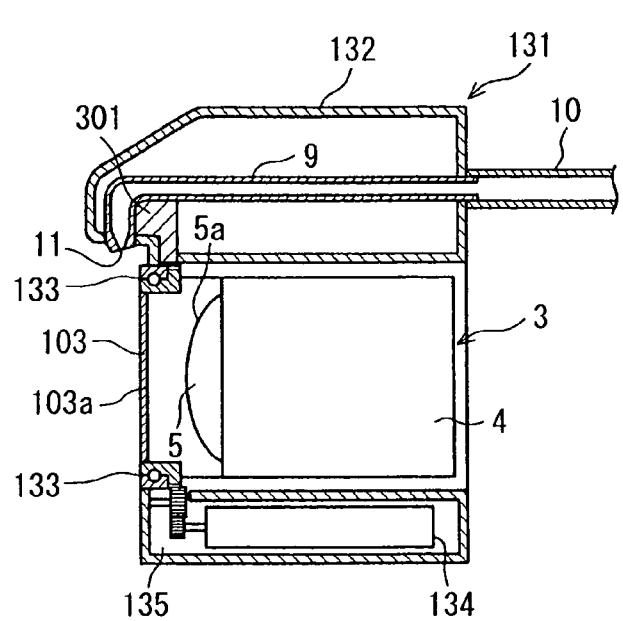
FIG. 38B is a diagram illustrating a cross-sectional side view of the optical sensor unit of FIG. 38A.

As shown in FIGS. 38A and 38B, like the configuration shown in FIGS. 17A and 17B, even when the heater 301 is included, the casing 132 of the camera cover 131 can be provided with the rotating mechanism 135 including the sealed bearing 133 and the motor 134 for causing the cover glass 103 to rotate. The rotating mechanism 135 can cause the cover glass 103 to rotate, while or after the washer fluid is sprayed from the spray opening 11 of the washer nozzle 9 onto the glass surface 103a of the cover glass 103.

Figure 39A:
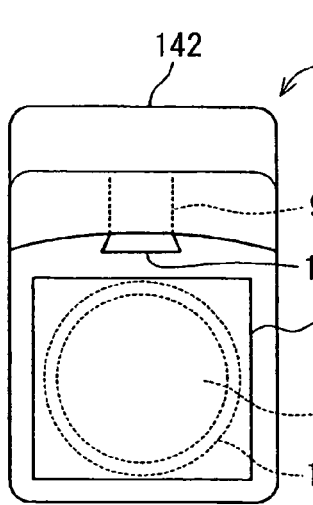
FIG. 39A is a diagram illustrating a front view of an optical sensor unit according to another modification.
Figure 39B:
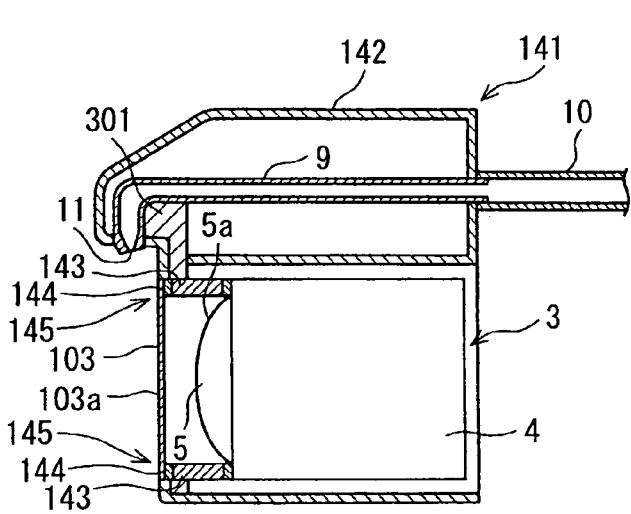
FIG. 39B is a diagram illustrating a cross-sectional side view of the optical sensor unit of FIG. 39A.

As shown in FIGS. 39A and 39B, like the configuration shown in FIGS. 18A and 18B, even when the heater 301 is included, the casing 142 of the camera cover 141 can be provided with the vibrating mechanism 145 including the piezoelectric device 143 and the electrode 144 for generating ultrasonic wave or subsonic wave that causes the cover glass 103 to vibrate. The vibrating mechanism 145 can cause the cover glass 103 to vibrate, while or after the washer fluid is sprayed from the spray opening 11 of the washer nozzle 9 onto the glass surface 103a of the cover glass 103.

As shown in FIGS. 40A and 40B, like the configuration shown in FIGS. 19A and 19B, even when the heater 301 is included, the casing 152 of the camera cover 151 can be provided with the air spraying mechanism 156 including the air nozzle 153, the tube 154, and the air pump 155 for spraying air onto the glass surface 103a of the cover glass 103. The air spraying mechanism 156 can spray air onto the glass surface 103a of the cover glass 103, while or after the washer fluid is sprayed from the spray opening 11 of the washer nozzle 9 onto the glass surface 103a of the cover glass 103.

The wiping mechanism 125 explained in FIGS. 37A and 37B, the rotating mechanism 135 explained in FIGS. 38A and 38B, the vibrating mechanism 145 explained in FIGS. 39A and 39B, and the air spraying mechanism 156 explained in FIGS. 40A and 40B can be configured to work in accordance with an operating status of the vehicle wiper. The wiping mechanism 125, the rotating mechanism 135, the vibrating mechanism 145, and the air spraying mechanism 156 can operate during a period of time when the vehicle wiper operates.

Any two or more of the above embodiments can be combined together. For example, the pan 63 explained in FIGS. 32A and 32B, the canopy 73 explained in FIGS. 33A and 33B, and the wiping mechanism 125 explained in FIGS. 37A and 37B can be included at the same time.

As shown in FIGS. 41A and 41B, when the pan 63 is included, a heater 302 (a pan heating device in the present invention) for heating the pan 63 can be included. In such an approach, it is possible to prevent the water fluid, dripping from the lens surface 5a and collecting in the pan 63, from freezing. Thus, the water fluid collecting in the pan 63 can be smoothly discharged. For example, the heater 302 can be a mesh of hot wires.

Figure 42A:
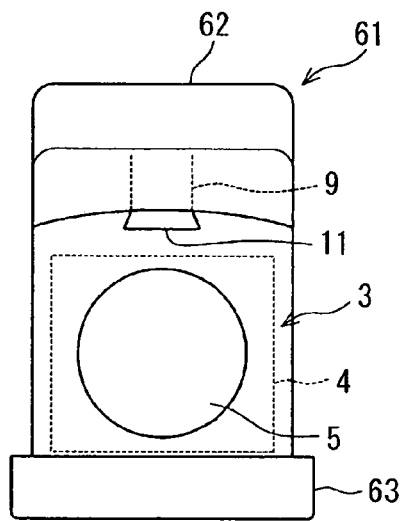
FIG. 42A is a diagram illustrating a front view of an optical sensor unit according to another modification.
Figure 42B:
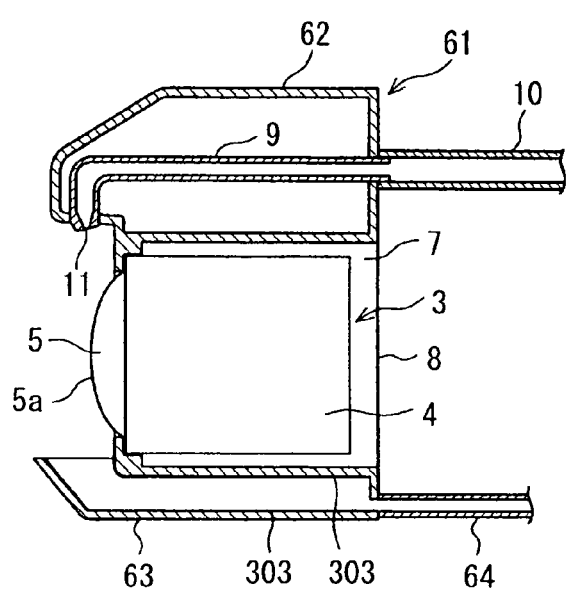
FIG. 42B is a diagram illustrating a cross-sectional side view of the optical sensor unit of FIG. 42A.

As shown in FIGS. 42A and 42B, when the pan 63 is included, a water-repellent treatment can be applied to a contact surface in contact with the washer fluid so that the contact surface can be coated with a water-repellent layer 303. Alternatively, a hydrophilic treatment can be applied to the contact surface so that the contact surface can be coated with a hydrophilic layer. In such an approach, the water fluid, dripping from the lens surface 5a and collecting in the pan 63, can be smoothly discharged.

Figure 43A:
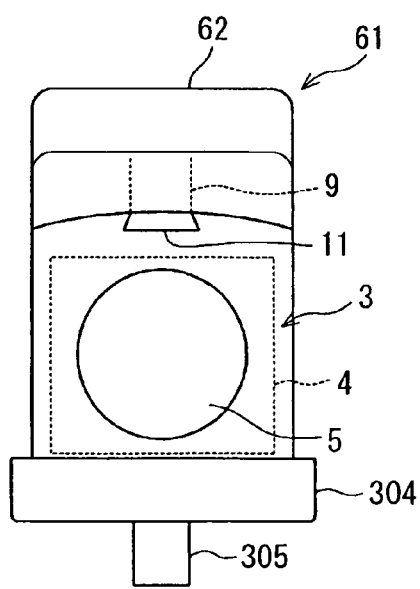
FIG. 43A is a diagram illustrating a front view of an optical sensor unit according to another modification.
Figure 43B:
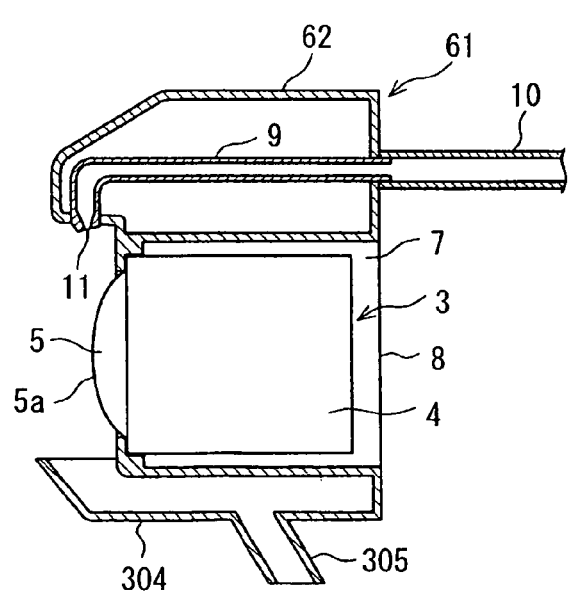
FIG. 43B is a diagram illustrating a cross-sectional side view of the optical sensor unit of FIG. 43A.

As shown in FIGS. 43A and 43B, when the pan 63 is included, a path 305 for guiding the water fluid collecting in the pan 63 to the window can be included. In such an approach, the washer fluid collecting in the pan 63 is recycled to wash the window and thus effectively used without being wasted.

As shown in FIGS. 44A and 44B, a path heater 306 (a path heating device in the present invention) for heating the path 305 can be included. In such an approach, it is possible to prevent the water fluid guided to the path 305 from freezing. Thus, the water fluid guided to the path 305 can be smoothly discharged. For example, the path heater 306 can be a mesh of hot wires.

As shown in FIGS. 45A and 45B, when the path 305 is included, a water-repellent treatment can be applied to a contact surface in contact with the washer fluid so that the contact surface can be coated with a water-repellent layer 307. Alternatively, a hydrophilic treatment can be applied to the contact surface so that the contact surface can be coated with a hydrophilic layer. In such an approach, the water fluid guided to the path 305 can be smoothly discharged.

Figure 46A:
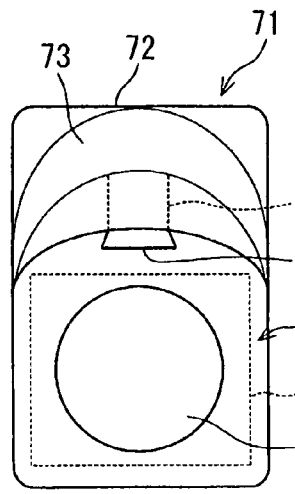
FIG. 46A is a diagram illustrating a front view of an optical sensor unit according to another modification.
Figure 46B:
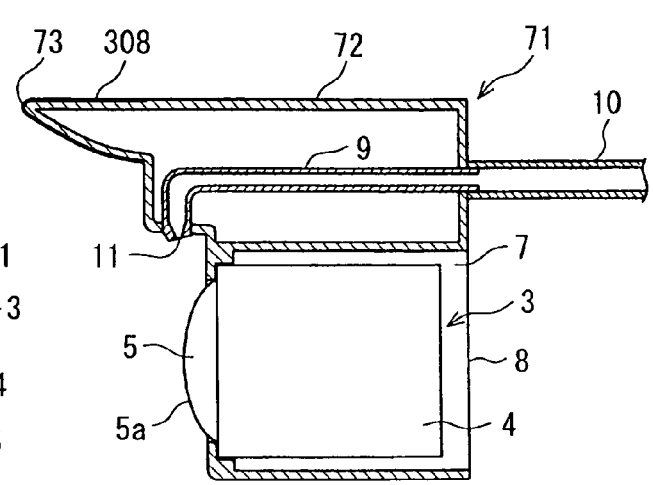
FIG. 46B is a diagram illustrating a cross-sectional side view of the optical sensor unit of FIG. 46A.

As shown in FIGS. 46A and 46B, when the canopy 73, projecting from the casing 72 and covering the lens surface 5a from above, is included, a canopy heater 308 (a canopy heating device in the present invention) for heating the canopy 73 can be included. In such an approach, it becomes less likely that snow and ice accumulate on the canopy 73. Further, even when snow and ice accumulate on the canopy 73, the accumulating snow and ice can be melted and removed to prevent the snow and ice from blocking the view of the optical sensor. For example, the canopy heater 308 can be a mesh of hot wires. The canopy heater 308 can be provided on each of a top side and a bottom side of the canopy 73. Alternatively, the canopy heater 308 can be provided on only the top side of the canopy 73.

Figure 47A:
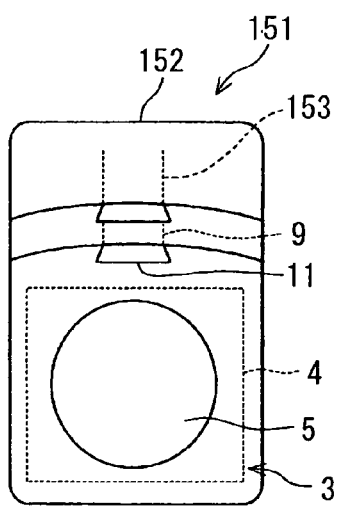
FIG. 47A is a diagram illustrating a front view of an optical sensor unit according to another modification.
Figure 47B:
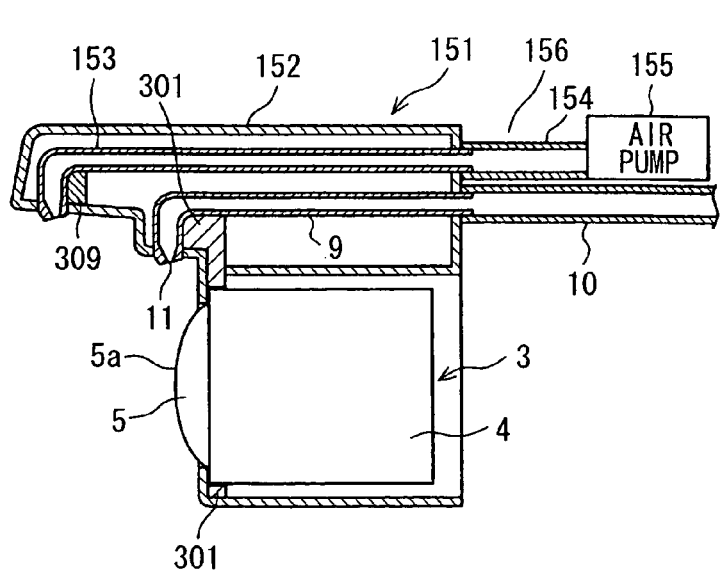
FIG. 47B is a diagram illustrating a cross-sectional side view of the optical sensor unit of FIG. 47A.

As shown in FIGS. 47A and 47B, when the air spraying mechanism 156 is included, an air heater 309 (an air heating device in the present invention) for heating air sprayed from the tip portion of the air nozzle 153 can be included. Alternatively, as shown in FIGS. 48A and 48B, when the air spraying mechanism 156 is included, an air nozzle heater 310 (an air spraying device heating device in the present invention) for heating the air nozzle 153 can be included. In such an approach, even if the washer fluid freezes to the lens surface 5a, the washer fluid freezing to the lens surface 5a can be removed. It is noted that the air heater 309 and the air nozzle heater 310 can be used in combination with each other.

Figure 50:
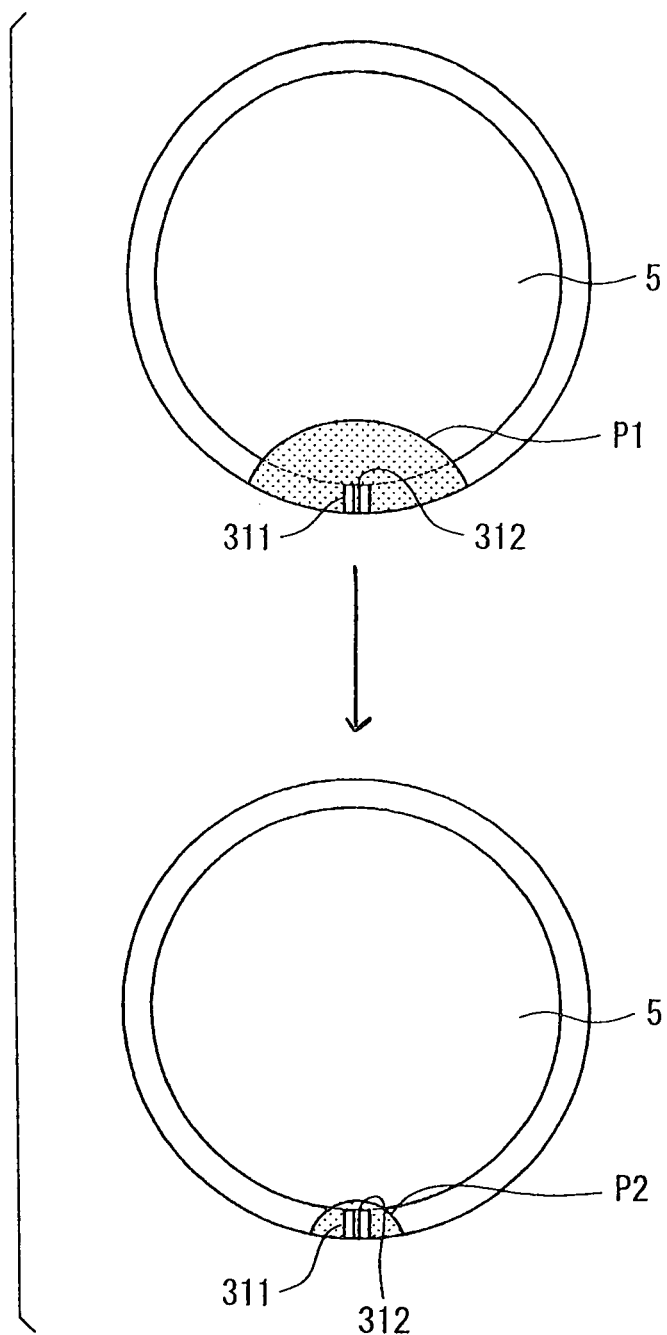
FIG. 50 is a diagram illustrating a manner in which washer fluid is removed in the optical sensor unit of FIGS. 49A and 49B.

As shown in FIGS. 49A and 49B, when the casing 82 of the camera cover 81 is provided with a projection 311 that is located at a position (directly below the lens 5) near the bottom edge of the lens surface 5a of the lens 5 of the camera 3, the projection 311 can have a clearance portion 312 extending in up and down directions. In such an approach, as shown in FIG. 50, capillary action occurs in the clearance portion 312 so that the water accumulating in the bottom edge of the lens surface 5a can be surely guided below the lens surface 5a through the clearance portion 312 and thus removed. That is, even when water accumulates in the bottom edge of the lens surface 5a, part of the water flows out due to capillary action so that the amount of the water accumulating in the bottom edge of the lens surface 5a can be reduced (in the case of FIG. 50, the amount is reduced from "P1" to "P2").

As shown in FIGS. 51A and 51B, the projection 311 can be provided with a projection heater 313 (a projection heating device in the present invention). In such an approach, it is possible to prevent the water left on the projection 311 from freezing.

As shown in FIGS. 52A and 52B, the casing 82 of the camera cover 81 can be provided with a slit portion 314 that is located at a position (directly below the lens 5) near the bottom edge of the lens surface 5a of the lens 5 of the camera 3. In such an approach, capillary action occurs in the slit portion 314 so that the water accumulating in the bottom edge of the lens surface 5a can be surely guided below the lens surface 5a through the slit portion 314 and thus removed.

As shown in FIG. 53, if it is determined that the image contains dirt ("YES" at step S201), the washer nozzle can perform the washing operation for a predetermined time period (step S203) upon satisfaction of any of the following operation conditions ("YES" at step S202): the gear of the vehicle is shifted into the reverse position, the IG switch is switched from the OFF state to the ON state, and the IG switch is switched from the ON state to the OFF state. Thus, the washing operation is not performed immediately after the dirt is detected. Since the washing operation is performed at a time when a use is likely to see the image, the washer fluid can be effectively used.

Figure 54:
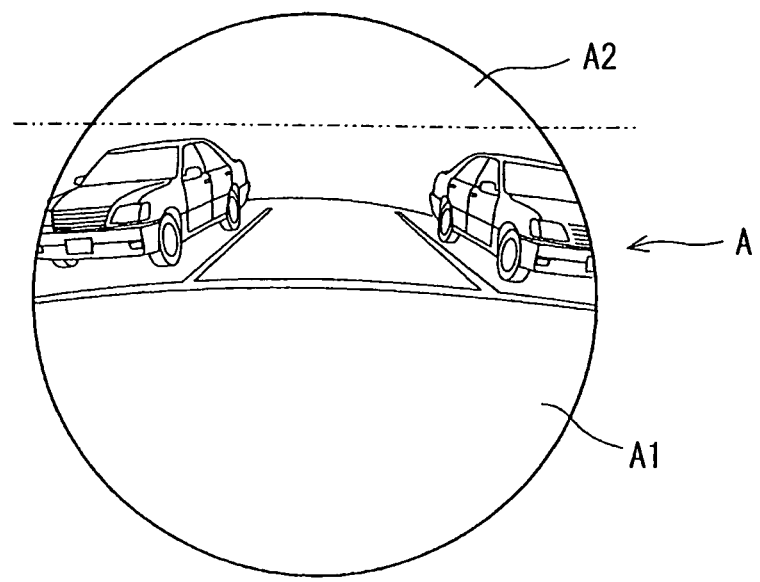
FIG. 54 is a diagram illustrating an image captured by the camera.

A region of the image captured by the optical sensor, which is supplied to a user, i.e., displayed on the display apparatus in the vehicle compartment, can be analyzed to detect whether the image contains dirt without analyzing another region of the image, which is not supplied to the user. That is, in the case of FIG. 54, an image A1 of an image A captured by the optical sensor corresponds to a bottom side of the fisheye lens 5 and is a region that is supplied to a user, and an image A2 of the image A captured by the optical sensor corresponds to a top side of the fisheye lens 5 and is a region that is not supplied to a user. In this case, it is detected whether the image A1 corresponding to the bottom side of the fisheye lens 5 contains the dirt. In such an approach, the necessary image A1 can be analyzed without additional analysis of the unnecessary image A2.

Figure 3:
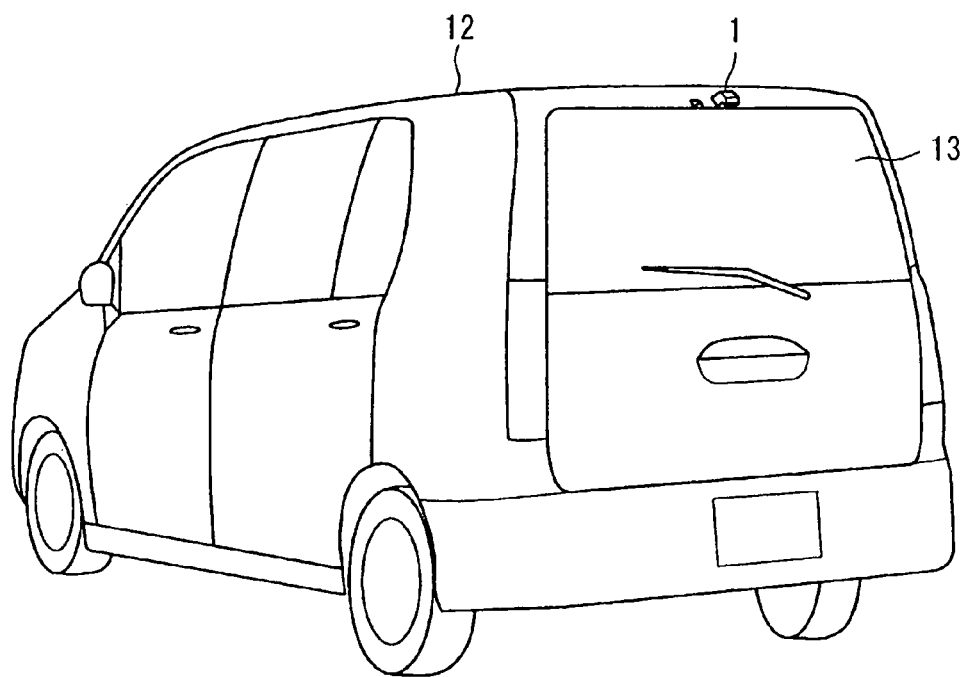
FIG. 3 is a diagram illustrating a perspective view of a vehicle equipped with the optical sensor unit according to the first embodiment.

It is noted that the on-board optical sensor cover according to the embodiments can be mounted above a vehicle window, for example, as shown in FIG. 3. In such an approach, the washer nozzle 9 can perform the washing operation not only to wash the lens surface 5a or the glass surface 103a by spraying the washer fluid onto the lens surface 5a or the glass surface 103a, but also to wash the vehicle window by recycling the washer fluid dripping from the lens surface 5a or the glass surface 103a.

Such changes and modifications are to be understood as being within the scope of the present invention as defined by the appended claims.

What is claimed is:

1. An on-board optical sensor cover comprising:
   a holder for holding an optical sensor having a lens;
   a washer nozzle for performing a washing operation to wash a lens surface of the lens of the optical sensor held in the holder or a glass surface of a cover glass located facing the lens by spraying a washer fluid, supplied from a washer fluid tank, onto the lens surface or the glass surface, and
   an air spraying device for performing a spraying operation to spray air onto the lens surface of the lens of the optical sensor or the glass surface of the cover glass,
   wherein
   the washer nozzle performs the washing operation,
   the air spraying device performs the spraying operation to spray the air onto the lens surface of the lens of the optical sensor or the glass surface of the cover glass while the washer nozzle performs the washing operation,
   the washer fluid and the air are sprayed from the same direction onto the lens surface or the glass surface, and
   the washer nozzle is located closer to the lens surface than an air nozzle of the air spraying device.

2. The on-board optical sensor cover according to claim 1, further comprising:
   a heater including at least one of an optical heating device and a nozzle heating device, the optical heating device for performing a heating operation to heat the lens surface of the lens of the optical sensor held in the holder or the glass surface of the cover glass, the nozzle heating device for performing a heating operation to heat the washer nozzle, wherein
   the at least one of the optical heating device and the nozzle heating device performs the heating operation.

3. The on-board optical sensor cover according to claim 2, wherein
   when both the optical heating device and the nozzle heating device are included, the optical heating device and the nozzle heating device are formed from the same member and integrated together into a single heating device.

4. The on-board optical sensor cover according to claim 2, wherein
   the optical heating device includes indium tin oxide that coats the lens surface of the lens of the optical sensor or the glass surface of the cover glass.

5. The on-board optical sensor cover according to claim 1, wherein
   the washer nozzle performs the washing operation not only to wash the lens surface of the lens of the optical sensor held in the holder or the glass surface of the cover glass by spraying the washer fluid onto the lens surface or the glass surface, but also to wash a window by spraying the washer fluid onto the window.

6. The on-board optical sensor cover according to claim 1, wherein
   the on-board optical sensor cover is configured to be mounted above a window, and
   the washer nozzle (9) performs the washing operation not only to wash the lens surface (5a) of the lens (5) of the optical sensor (3) held in the holder (7) or the glass surface (103a) of the cover glass (103) by spraying the washer fluid onto the lens surface (5a) or the glass surface (103a), but also to wash the window by recycling the washer fluid dripping from the lens surface (5a) or the glass surface (103a).

7. The on-board optical sensor cover according to claim 1, further comprising:
   a window washer nozzle for performing a washing operation to wash a window by spraying the washer fluid, supplied from the washer fluid tank, onto the window, wherein
   the window washer nozzle performs the washing operation.

8. The on-board optical sensor cover according to claim 1, wherein;
   the holder holds a lighting device, and
   the washer nozzle performs the washing operation not only to wash the lens surface of the lens of the optical sensor held in the holder or the glass surface of the cover glass by spraying the washer fluid onto the lens surface or the glass surface, but also to wash the lighting device by spraying the washer fluid onto the lighting device.

9. The on-board optical sensor cover according to claim 8, wherein
   the lighting device includes an infrared lamp or a visible-light lamp.

10. The on-board optical sensor cover according to claim 1, further comprising:
    a pan for catching the washer fluid dripping from the lens surface of the lens or the glass surface of the cover glass, when the washer nozzle performs the washing operation.

11. The on-board optical sensor cover according to claim 10, further comprising:
   a pan heating device for heating the pan, wherein
   the pan heating device performs a heating operation.

12. The on-board optical sensor cover according to claim 10, wherein
   the pan has a contact surface in contact with the washer fluid, and
   a water-repellent treatment or a hydrophilic treatment is applied to the contact surface so that the contact surface is coated with a water-repellent layer or a hydrophilic layer.

13. The on-board optical sensor cover according to claim 10, further comprising:
   a path for guiding the water fluid collecting in the pan to a window.

14. The on-board optical sensor cover according to claim 13, further comprising:
   a path heating device for heating the path, wherein
   the path heating device performs a heating operation.

15. The on-board optical sensor cover according to claim 13, wherein
   the path has a contact surface in contact with the washer fluid, and
   a water-repellent treatment or a hydrophilic treatment is applied to the contact surface so that the contact surface is coated with a water-repellent layer or a hydrophilic layer.

16. The on-board optical sensor cover according to claim 1, further comprising:
   a canopy having a projection for covering from above the lens surface of the lens of the optical sensor or the glass surface of the cover glass.

17. The on-board optical sensor cover according to claim 16, further comprising:
   a canopy heating device for heating the canopy, wherein
   the canopy heating device performs a heating operation.

18. The on-board optical sensor cover according to claim 1, wherein
   the washer nozzle is located on the side of the holder and performs the washing operation to wash the lens surface of the lens of the optical sensor held in the holder or the glass surface of the cover glass located facing the lens by spraying the washer fluid, supplied from the washer fluid tank, onto the lens surface or the glass surface from the side of the lens of the optical sensor or the cover glass.

19. The on-board optical sensor cover according to claim 1, wherein
   a water-repellent treatment, a hydrophilic treatment, a photocatalytic treatment, or an antifouling treatment is applied to the lens surface of the lens of the optical sensor or the glass surface of the cover glass, so that the lens surface or the glass surface is coated with a water-repellent layer, a hydrophilic layer, a photocatalytic layer, or an antifouling layer.

20. The on-board optical sensor cover according to claim 1, further comprising:
   a projection located at a position near a bottom edge of the lens surface of the lens.

21. The on-board optical sensor cover according to claim 20, wherein
   the projection is movable in up and down directions.

22. The on-board optical sensor cover according to claim 20, further comprising:
   a projection heating device for heating the projection.

23. The on-board optical sensor cover according to claim 20, wherein
   the projection has a clearance portion extending in up and down directions.

24. The on-board optical sensor cover according to claim 1, further comprising:
   a slit portion located at a position near a bottom edge of the lens surface of the lens.

25. The on-board optical sensor cover according to claim 1, further comprising:
   a wiping device for performing a wiping operation to wipe the lens surface of the lens of the optical sensor or the glass surface of the cover glass, wherein
   the wiping device performs the wiping operation to wipe the lens surface of the lens of the optical sensor or the glass surface of the cover glass, while or after the washer nozzle performs the washing operation.

26. The on-board optical sensor cover according to claim 1, further comprising:
   a rotating device for performing a rotating operation to rotate the lens of the optical sensor or the cover glass, wherein
   the rotating device performs the rotating operation to rotate the lens of the optical sensor or the cover glass, while or after the washer nozzle performs the washing operation.

27. The on-board optical sensor cover according to claim 26, wherein
   the rotating device performs a rotating operation to rotate the lens of the optical sensor or the cover glass on condition that a vehicle speed is greater than or equal to a predetermined speed.

28. The on-board optical sensor cover according to claim 26, wherein
   the rotating device performs the rotating operation to rotate the lens of the optical sensor or the cover glass on condition that a window near which the on-board optical sensor cover is mounted is closed to a position that prevents a user from touching the on-board optical sensor cover by leaning out of the window.

29. The on-board optical sensor cover according to claim 1, further comprising:
   an ultrasonic vibrating device for performing an ultrasonic vibrating operation to ultrasonically vibrate the lens of the optical sensor or the cover glass, wherein
   the ultrasonic vibrating device performs the ultrasonic vibrating operation to ultrasonically vibrate the lens of the optical sensor or the cover glass, while or after the washer nozzle performs the washing operation.

30. The on-board optical sensor cover according to claim 1, further comprising:
   a subsonic vibrating device for performing a subsonic vibrating operation to subsonically vibrate the lens of the optical sensor or the cover glass, wherein
   the subsonic vibrating device performs the subsonic vibrating operation to subsonically vibrate the lens of the optical sensor or the cover glass, while or after the washer nozzle performs the washing operation.

31. The on-board optical sensor cover according to claim 1, further comprising:
   an air heating device for heating the air sprayed from the air spraying device.

32. The on-board optical sensor cover according to claim 1, further comprising:
   an air spraying device heating device for heating the air spraying device.

33. The on-board optical sensor cover according to claim 25, wherein
   the wiping device performs the wiping operation during a period of time when a vehicle wiper operates.

34. The on-board optical sensor cover according to claim 1, wherein
the washer nozzle is located in an area outside an angle of view of the optical sensor.

35. An on-board optical sensor apparatus comprising:
the on-board optical sensor cover defined in claim 1;
a control device for controlling the washing operation of the washer nozzle; and
the optical sensor having the lens.

36. The on-board optical sensor apparatus according to claim 35, further comprising:
a gear position detecting device for detecting a position of a gear of a vehicle, wherein
when the gear position detecting device detects that the position of the gear of the vehicle is in a predetermined position, the control device causes the washer nozzle to perform the washing operation.

37. The on-board optical sensor apparatus according to claim 35, further comprising:
a vehicle activation start detection device for detecting start of activation of a vehicle, wherein
when the vehicle activation start detection device detects the start of activation of the vehicle, the control device causes the washer nozzle to perform the washing operation.

38. The on-board optical sensor apparatus according to claim 35, further comprising:
a vehicle activation end detection device for detecting end of activation of a vehicle, wherein
when the vehicle activation end detection device detects the end of activation of the vehicle, the control device causes the washer nozzle to perform the washing operation.

39. The on-board optical sensor apparatus according to claim 35, further comprising:
an image dirt detection device for analyzing an image captured by the optical sensor to detect whether the image contains dirt, wherein
when the image dirt detection device detects that the image captured by the optical sensor contains the dirt, the control device causes the washer nozzle to perform the washing operation.

40. The on-board optical sensor apparatus according to claim 39, wherein
the image dirt detection device analyzes a first region of the image captured by the optical sensor to detect whether the first region of the image contains dirt and does not analyze a second region of the image,
the first region is provide to a user, and
the second region is not provided to the user.

41. The on-board optical sensor apparatus according to claim 39, wherein
when the image dirt detection device detects that the image captured by the optical sensor contains the dirt, the control device causes the washer nozzle to continue the washing operation until the dirt is removed.

42. The on-board optical sensor apparatus according to claim 39, wherein
when the image dirt detection device detects that the image captured by the optical sensor contains the dirt, the control device causes the washer nozzle to continue the washing operation until the dirt is removed or until the washing operation reaches a predetermined condition, and
when the washing operation of the washer nozzle reaches the predetermined condition, the control device causes a reporting device to perform a reporting operation.

43. The on-board optical sensor apparatus according to claim 39, further comprising:
at least one of a gear position detecting device for detecting a position of a gear of a vehicle, a vehicle activation start detection device for detecting start of activation of a vehicle, and vehicle activation end detection device for detecting end of activation of a vehicle, wherein
when the image dirt detection device detects that the image captured by the optical sensor contains the dirt, the control device causes the washer nozzle to perform the washing operation on condition that the gear position detecting device detects that the position of the gear of the vehicle is in a predetermined position, the vehicle activation start detection device detects the start of activation of the vehicle, or the vehicle activation end detection device detects the end of activation of the vehicle.

44. The on-board optical sensor apparatus according to claim 41, further comprising:
at least one of a gear position detecting device for detecting a position of a gear of a vehicle, a vehicle activation start detection device for detecting start of activation of a vehicle, and vehicle activation end detection device for detecting end of activation of a vehicle, wherein
when the image dirt detection device detects that the image captured by the optical sensor contains the dirt, the control device causes the washer nozzle to continue the washing operation until the dirt is removed, on condition that the gear position detecting device detects that the position of the gear of the vehicle is in a predetermined position, the vehicle activation start detection device detects the start of activation of the vehicle, or the vehicle activation end detection device detects the end of activation of the vehicle, the control device causes the washer nozzle to perform the washing operation.

45. The on-board optical sensor apparatus according to claim 42, further comprising:
at least one of a gear position detecting device for detecting a position of a gear of a vehicle, a vehicle activation start detection device for detecting start of activation of a vehicle, and vehicle activation end detection device for detecting end of activation of a vehicle, wherein
when the image dirt detection device detects that the image captured by the optical sensor contains the dirt, the control device causes the washer nozzle to continue the washing operation until the dirt is removed or until the washing operation reaches a predetermined condition, on condition that the gear position detecting device detects that the position of the gear of the vehicle is in a predetermined position, the vehicle activation start detection device detects the start of activation of the vehicle, or the vehicle activation end detection device detects the end of activation of the vehicle, and
when the washing operation of the washer nozzle reaches the predetermined condition, the control device causes the reporting device to perform the reporting operation.

46. The on-board optical sensor apparatus according to claim 35, further comprising:
an ambient temperature measuring device for measuring an ambient temperature, wherein
when the temperature measured by the ambient temperature measuring device is less than a predetermined temperature, the control device causes the optical heating device to continue the heating operation until the temperature measured by the ambient temperature measuring device becomes equal to or greater than the predetermined temperature.

47. The on-board optical sensor apparatus according to claim 35, further comprising:
   a sensor temperature measuring device for measuring a temperature of the optical sensor, wherein
   when the temperature measured by the sensor temperature measuring device is less than a predetermined temperature, the control device causes the optical heating device to continue the heating operation until the temperature measured by sensor temperature measuring device becomes equal to or greater than the predetermined temperature.

48. The on-board optical sensor apparatus according to claim 35, further comprising:
   an image fog detection device for analyzing an image captured by the optical sensor to detect whether the image contains fog, wherein
   when the image fog detection device detects that the image captured by the optical sensor contains the fog, the control device causes the optical heating device to perform the heating operation.

49. The on-board optical sensor apparatus according to claim 48, wherein
   when the image fog detection device detects that the image captured by the optical sensor contains the fog, the control device causes the optical heating device to continue the heating operation until the fog is removed.

50. The on-board optical sensor apparatus according to claim 48, wherein
   when the image fog detection device detects that the image captured by the optical sensor contains the fog, the control device causes the optical heating device to continue the heating operation until the fog is removed or until the heating operation reaches a predetermined condition, and
   when the heating operation of the optical heating device reaches the predetermined condition, the control device causes a reporting device to perform a reporting operation.

51. The on-board optical sensor cover according to claim 1, wherein
   the air spraying device performs the spraying operation both while and after the washer nozzle performs the washing operation.

\* \* \* \* \*